(12) United States Patent
Corson

(10) Patent No.: US 11,468,605 B2
(45) Date of Patent: Oct. 11, 2022

(54) VR REAL PLAYER CAPTURE FOR IN-GAME INTERACTION VIEW

(71) Applicant: Sony Interactive Entertainment Inc., Tokyo (JP)

(72) Inventor: Greg Corson, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 22 days.

(21) Appl. No.: 16/712,945

(22) Filed: Dec. 12, 2019

(65) Prior Publication Data

US 2021/0183114 A1 Jun. 17, 2021

(51) Int. Cl.
| | |
|---|---|
| G09G 5/00 | (2006.01) |
| G06T 11/00 | (2006.01) |
| G06F 3/01 | (2006.01) |
| A63F 13/655 | (2014.01) |
| A63F 13/213 | (2014.01) |
| A63F 13/26 | (2014.01) |

(52) U.S. Cl.
CPC ............ *G06T 11/00* (2013.01); *A63F 13/213* (2014.09); *A63F 13/26* (2014.09); *A63F 13/655* (2014.09); *G06F 3/011* (2013.01)

(58) Field of Classification Search
CPC ......... G06T 19/006; G06T 7/70; G06T 19/20; G06F 3/011; G06F 3/012; G06F 1/163; G06F 3/04815; G02B 27/017; H04N 13/344; H04N 13/117
See application file for complete search history.

(56) References Cited

U.S. PATENT DOCUMENTS

| | | | | |
|---|---|---|---|---|
| 2016/0189429 | A1* | 6/2016 | Mallinson | G02B 27/017 345/633 |
| 2017/0201478 | A1* | 7/2017 | Joyce | H04L 67/42 |
| 2019/0156579 | A1* | 5/2019 | Sheftel | H04N 5/23293 |
| 2019/0304406 | A1* | 10/2019 | Griswold | G09G 5/14 |

\* cited by examiner

*Primary Examiner* — Jennifer Mehmood
(74) *Attorney, Agent, or Firm* — Penilla IP, APC

(57) ABSTRACT

A method is provided for rendering a mixed reality video. The method includes operations for capturing a head mounted display (HMD) game play by a user of a video game that is being executed on a computing system where the HMD game play is being captured from game play point of view (POV). The method further includes operations for identifying, by the computing system, a coordinate location of a camera that has a camera POV used to view the user during the HMD game play. In addition, the method further includes replaying the HMD game play to adjust the game play POV so that it substantially aligns with the camera POV. Moreover, the method includes rendering the mixed reality video by compositing video from the HMD game play after adjusting the game play POV and video from the camera POV. Rendering the mixed reality video also includes removing the background captured in the video from the camera POV so that the user appears partially within a scene of the video game when rendered in the mixed reality video.

20 Claims, 19 Drawing Sheets

VR REAL PLAYER CAPTURE FOR IN-GAME INTERACTION VIEW

BACKGROUND

1. Field of the Disclosure

The present disclosure relates to rendering mixed reality video using reduced computational resourced systems.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce very detailed and engaging gaming experiences.

Example gaming platforms include the Sony Playstation®, Sony Playstation2® (PS2), Sony Playstation3® (PS3), and Sony Playstation4® (PS4), each of which is sold in the form of a game console. As is well known, the game console is designed to connect to a display (typically a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console may be further designed with an optical disc reader for receiving game discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is use a head-mounted display (HMD). A head-mounted display is worn by the user and can be configured to present various graphics, such as a view of a virtual space. The graphics presented on a head-mounted display can cover a large portion or even all of a user's field of view. Hence, a head-mounted display can provide a visually immersive virtual reality experience to the user, as the HMD renders a three-dimensional real-time view of the virtual environment in a manner that is responsive to the user's movements. Although HMD systems are immersive, persons that may be located in the same space as the user of the HMD may not be able to experience the richness of the environment. To this end, systems that implement a type of mixed reality have begun to appear in the marketplace. Unfortunately, some mixed reality systems that incorporate the user of the HMD require high levels of computational resources.

It is in this context that implementations of the disclosure arise.

SUMMARY

Implementations of the present disclosure include devices, methods and systems relating to generating a mixed reality video of a user playing an HMD game, wherein the adjustments are made between to a game play POV relative to a camera POV using a multi-pass processing technique. Various embodiments will be described below for purposes of providing examples of the disclosed methods and systems.

Methods for generating mixed reality view(s), for spectators, are provided. By way of example, while the player is playing a game, the game is generating a 3D view from the player's point of view for the HMD. To do one (or more) mixed reality spectator views, the game is also simultaneously rendered from other points of view. In one embodiment, a camera (in the real world) is pointed at the player. The real world camera and the spectator view generated by the game are aligned so their views appear to approximately match or align. The background behind the player is removed and these two views combined into one so the player appears to be standing inside the game. In another embodiment, the position of the player's head (and potentially entire body) is tracked and instead of using a video image of the player in the mixed reality view a 3D character (e.g., avatar) is used. These processes can require considerable extra computing resources because the game must generate one or more extra views, process video of the player and combine them together to create the mixed reality spectator views. The methods described in more detail herein propose the use of a multi-pass process to overcome this limitation.

In another embodiment, a method is disclosed for rendering a mixed reality video. The method includes operations for capturing a head mounted display (HMD) game play by a user of a video game that is being executed on a computing system where the HMD game play is being captured from game play point of view (POV). The method further includes operations for identifying, by the computing system, a coordinate location of a camera that has a camera POV used to view the user during the HMD game play. In addition, the method further includes replaying the HMD game play to adjust the game play POV so that it substantially aligns with the camera POV. Moreover, the method includes rendering the mixed reality video by compositing video from the HMD game play after adjusting the game play POV and video from the camera PO. Rendering the mixed reality video also includes removing the background captured in the video from the camera POV so that the user appears partially within a scene of the video game when rendered in the mixed reality video.

In yet another embodiment, a method is disclosed for rendering a mixed reality video. The method includes operations for capturing head mounted display (HMD) game play by a user of a video game that is being executed on a computing system where the HMD game play being captured from game play point of view (POV). The method further includes operations for identifying, by the computing system, a coordinate location of a camera which has a camera POV used to view the user during the HMD game play. The method also includes replaying the HMD game play to adjust the game play POV to set a view offset with respect to the camera POV. Moreover, the method includes rendering the mixed reality video by compositing video from the HMD game play after adjusting of the game play POV and video from the camera POV. Rendering the mixed reality video also includes removing the background captured in the video from the camera POV so that the user appears partially within a scene of the video game when rendered in the mixed reality video.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIGS. 8A-1 and 8A-2 illustrate a head-mounted display (HMD), in accordance with an implementation of the disclosure.

DETAILED DESCRIPTION

Figure 1A:
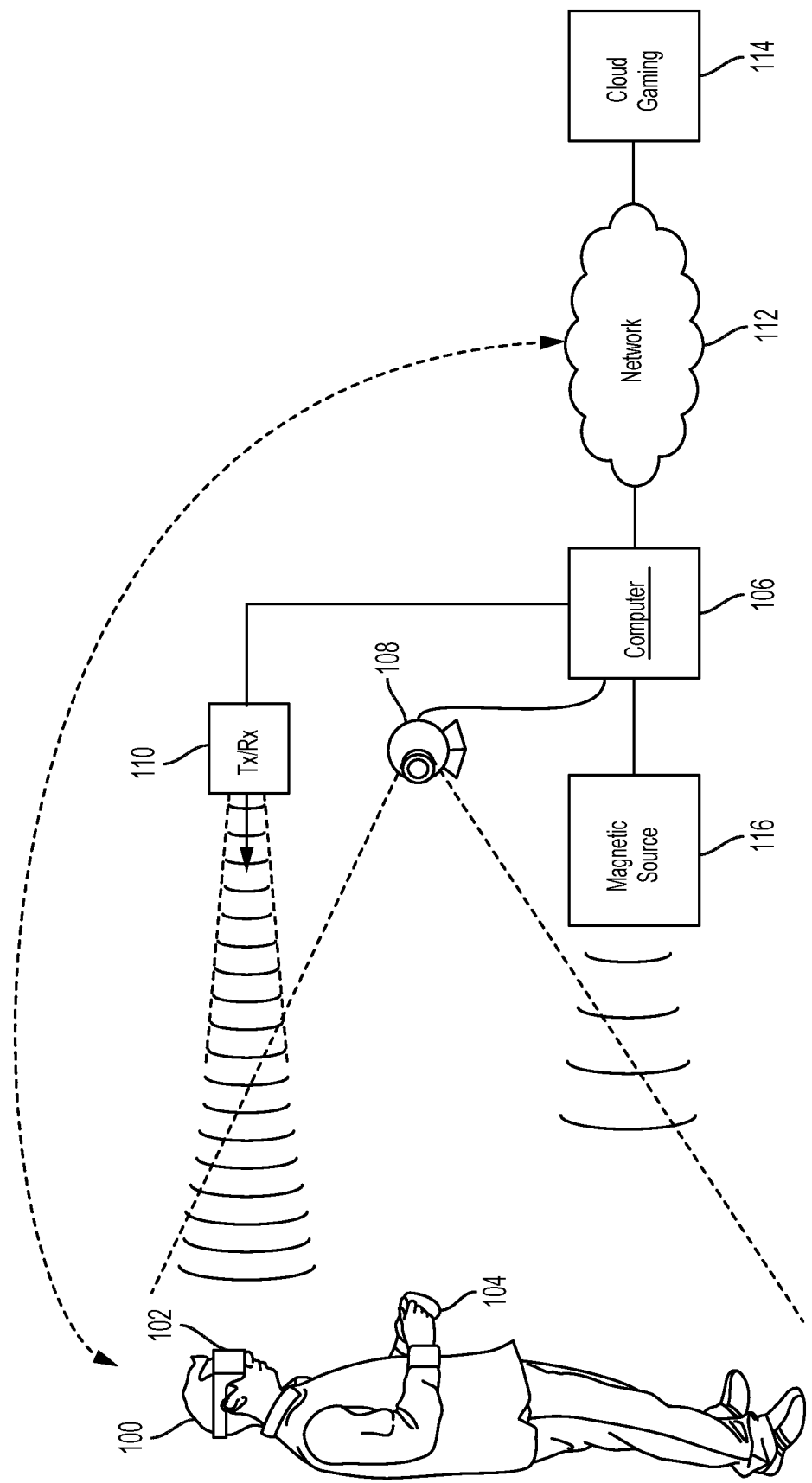
FIG. 1A illustrates a system for interaction with a virtual environment via a head-mounted display (HMD), in accordance with implementations of the disclosure.

The following implementations of the present disclosure provide devices, methods, and systems relating to generation of mixed reality video content with reduced computational resources. In one embodiment, a system is disclosed that enables two-pass processing. In pass-one, image data of a user playing an HMD game in a real-world space, is captured. Also during pass-one, metadata from the user's game play in the HMD environment is recorded. The metadata is used to enable replay of the game play from any viewing angle. In pass-two, the user's game play is replayed, e.g., re-executed using inputs in the metadata, to enable generation of an adjust view into the user's game play. The adjustment, i.e., from a different point of view, in one embodiment, causes a replay of the game from a view angle that is adjusted to align to the view angle of the camera viewing the user playing the HMD game in the real-world space. In another embodiment, the adjustment can be one or more other angles that may not align to the view angle of the camera viewing the user play the HMD game in the real-world space. Next, the adjusted view of the game play is composited with the view of the user playing the game to generate a mixed reality video of the user playing in the virtual environment. In another embodiment no camera is used, and the view of the game from a different point of view will include a 3D character/avatar that represents the game player. This character is animated using the player's motions so it appears to be playing the game.

It will be obvious, however, to one skilled in the art that the present disclosure may be practiced without some or all of the specific details presently described. In other instances, well known process operations have not been described in detail in order not to unnecessarily obscure the present disclosure.

The following embodiments describe methods, computer programs, and apparatus of rendering a mixed reality video to captures a user's performance during game play and the user's in-game interaction view. Accordingly, the mixed reality video can allow a viewer (e.g., spectator) to have an immersive view of the game that the user played and be able to see all movements that the user performed during the game play. The mixed reality video, in one embodiment, mixes a view of the user at least partially in the game. This mixed reality view enables others, e.g., spectators or friends of the user to enjoy a view into the game that is not possible when simply viewing a user, wearing a head mounted display (HMD), play a game.

In accordance with one embodiment, a system is disclosed for capturing and user's game performance and rendering a mixed reality video that combines the user's game play performance and the user's in-game interaction view. In one embodiment, a system includes a computer that is configured to execute a virtual reality video game of a user playing the virtual reality video game in front of a green screen. During game play, the user may be wearing an HMD which allows the user to interact and view the virtual space/environment through the HMD. The system may include interface objects such as handheld controllers that enable the user to interact with the virtual reality video game, by interacting with the game via the handheld controllers. A rear camera is set up behind or to the side of the user to capture the user's performance during game play. The rear camera is configured to have a camera point of view (POV) that has a periphery that can capture the user, green screen, and any other objects within the camera POV. In one embodiment, the system is configured to re-execute the game to generate an adjusted game play POV video that substantially aligns with the camera POV. Once game play POV video is aligned to the camera POV video, the system will proceed to composite the two videos to generate a mixed reality video. As part of the compositing, the green screen will be removed so that the mixed reality video will show the user interacting in the virtual reality space of the game.

In accordance with another embodiment, a two-pass approach can be implemented to render the mixed reality video. Because computing power may be limited on a computer, the two-pass approach provides an effective solution to render a mixed reality video. For example, when a computer executes a virtual reality video game, a majority of the computer's computing resources are utilized to execute the virtual reality video game, and the computer may not have a sufficient amount of computing power to simultaneously render the mixed reality video. Accordingly, the two-pass approach is an effective solution because the rendering of the mixed reality video can be divided into two stages, pass-one and pass-two.

In one embodiment, pass-one, involves the creation of the camera POV video and an adjusted camera POV video. For example, when the user plays the virtual reality video game, metadata of the game play is recorded and saved by the computer. In addition, while playing the virtual reality video game, the rear camera captures a camera POV video of the user's game play performance. In one embodiment, at the start of pass-one, the system may perform a calibration. The calibration is performed in order to identify the spatial coordinate position of the camera that is placed behind the user or side of the user, relative to the spatial coordinates of the tracked HMD and/or the controllers. In one embodiment, it is possible to identify calibration the system by placing a controller proximate to the camera and selecting a button during calibration. In another embodiment, it is possible for the camera to be a stereo camera, which enables it to determine its position in the room. In another embodiment, calibration may include having the user move a controller to a location in space corresponding to a floating menu or object, as viewed via the HMD. Broadly speaking, the calibration process can be carried out before starting game play during pass-one, during game play in pass-one, or a combination of before and during game play of pass-one.

In one embodiment, during pass-two, the game is re-executed using the metadata to align it to the camera POV. For example, while playing the virtual reality video game the camera POV may not be in the same position with the game play POV. In some cases, during the user's game play, the user may be fully immersed in virtual environment and not realize that the user moved around in various angles and directions. For instance, at the end of the game play, the user may end up in a position that differs from the position that the user was in when the user started the game play. Because of all the movements and maneuvers that the user made during game play, the game play POV video and the camera POV may be misaligned. In accordance with one embodiment, the game play POV may need to be adjusted to be substantially aligned with the camera POV. The alignment process, in one embodiment, includes causing a replay of the game play session with an adjustment in camera POV. In the replay process, the system will use state data from the game play video produced when the user played the game. This state data, in one embodiment, is included in the metadata and saved with or without the game play video. The replay system, in one embodiment, causes re-execution of the game code of the game to recreate the game actions performed by the user. However, in addition to causing a re-execution of the game code of the game, an input or parameters defining the angle and orientation needed or desired for the replay so that the game play POV is rendered based on the adjustment.

That is, the new game play POV is now different than it was during the original user game play. In this embodiment, this enables the new game play POV to substantially align to the camera POV. As described below, it is also possible for the replay to select angles and orientations that are not aligned. This would allow custom points of view into the game, depending on the game circumstances and scenarios. Once the adjustment is made to the game play POV, the computer combines the camera POV video and the adjusted game play POV video to render a mixed reality video.

In one embodiment, pre-processing of the camera POV video may include removing the green screen that was captured in the camera POV video. Once the pre-processing steps have been performed, the computer renders the mixed reality video by composting the camera POV video and the updated game play POV video.

For some embodiments, the mixed reality video may be performed using a single-pass approach rather than the two-pass approach, as discussed above. In this embodiment, two computers can be used in conjunction to render the mixed reality video and perform pass-one and pass-two. For this implementation, the system utilizes the same components as described for the two-pass approach; however, a second computer can be incorporated. For the single-pass approach, a first computer is used to execute the virtual reality video game. While the first computer executes the virtual reality video game, the second computer receives the recording from the camera POV. In substantial real-time, the second computer receives the metadata for game play POV from the first computer and makes the adjustments to align the game play POV video with the camera POV video. The second computer also digitally removes the green screen from the camera POV video. The second computer then proceeds to render the mixed reality video by composting the game play POV video with the camera POV video. For this approach, the first computer and the second computer work in conjunction so that the mixed reality video can be rendered in a single pass rather than two. In this embodiment, this allows a spectator to view the user playing the video game on a screen, in mixed reality mode, while the user moves around playing and wearing the HMD.

In accordance with another embodiment, a cell phone camera may be used by a spectator in lieu of the rear camera to capture the user's performance during game play. In this embodiment, unlike the rear camera, the cell phone camera is not in a fixed position. The cell phone camera and can move dynamically at the discretion of the cell phone user (i.e., spectator). Because the cell phone camera is not fixed, the spectator can capture the user's performance from various views and angles. For example, while the user is playing the virtual reality game, a spectator might spontaneously pull out their cell phone camera to record the user because the user is performing extremely well during the game play. In addition, the spectator can capture the user's performance from various viewpoints and angles. For example, while recording the performance, the spectator can maneuver around the periphery of the user to capture the user's performance from various perspectives. These perspectives can include a rear view, side view, front view, or any combination of these perspectives. In this embodiment, the position of the phone is substantially moving constantly over time, creating instantaneously recordable positions and angles (i.e., points of view). During the second-pass, the system will make adjustments to the game play POV to create adjusted game play POVs, that are adjusted based on the instantaneously recorded positions and angles. As described above, the adjustments to the game play POV is done, in one embodiment, using a replay mode that re-executes the game using at the new POV.

FIG. 1A illustrates a system for interaction with a virtual environment via a head-mounted display (HMD), in accordance with implementations of the disclosure. An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space. For example, the user may see a three-dimensional (3D) view of the virtual space when facing in a given direction, and when the user turns to a side and thereby turns the HMD likewise, then the view to that side in the virtual space is rendered on the HMD. In the illustrated implementation, a user 100 is shown wearing a head-mounted display (HMD) 102. The HMD 102 is worn in a manner similar to glasses, goggles, or a helmet, and is configured to display a video game or other content to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user, and may also provide viewing with three-dimensional depth and perspective.

In the illustrated implementation, the HMD 102 is wirelessly connected to a computer 106. In other implementations, the HMD 102 is connected to the computer 106 through a wired connection. The computer 106 can be any general or special purpose computer known in the art, including but not limited to, a gaming console, personal computer, laptop, tablet computer, mobile device, cellular phone, tablet, thin client, set-top box, media streaming device, etc. In some implementations, the computer 106 can be configured to execute a video game, and output the video and audio from the video game for rendering by the HMD 102. In some implementations, the computer 106 is configured to execute any other type of interactive application that provides a virtual space/environment that can be viewed through an HMD. A transceiver 110 is configured to transmit (by wired connection or wireless connection) the video and audio from the video game to the HMD 102 for rendering thereon. The transceiver 110 includes a transmitter for transmission of data to the HMD 102, as well as a receiver for receiving data that is transmitted by the HMD 102.

In some implementations, the HMD 102 may also communicate with the computer through alternative mechanisms or channels, such as via a network 112 to which both the HMD 102 and the computer 106 are connected.

The user 100 may operate an interface object 104 to provide input for the video game. Additionally, a camera 108 can be configured to capture images of the interactive environment in which the user 100 is located. These captured images can be analyzed to determine the location and movements of the user 100, the HMD 102, and the interface object 104. In various implementations, the interface object 104 includes a light which can be tracked, and/or inertial sensor(s), to enable determination of the interface object's location and orientation and tracking of movements.

In some implementations, a magnetic source 116 is provided that emits a magnetic field to enable magnetic tracking of the HMD 102 and interface object 104. Magnetic sensors in the HMD 102 and the interface object 104 can be configured to detect the magnetic field (e.g. strength, orientation), and this information can be used to determine and track the location and/or orientation of the HMD 102 and the interface object 104.

In some implementations, the interface object 104 is tracked relative to the HMD 102. For example, the HMD 102 may include an externally facing camera that captures images including the interface object 104. The captured images can be analyzed to determine the location/orientation of the interface object 104 relative to the HMD 102, and using a known location/orientation of the HMD, so determine the location/orientation of the interface object 104 in the local environment.

The way the user interfaces with the virtual reality scene displayed in the HMD 102 can vary, and other interface devices in addition to interface object 104, can be used. For instance, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment presented on the HMD 102.

Additionally, the HMD 102 may include one or more lights which can be tracked to determine the location and orientation of the HMD 102. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In some implementations, the computer 106 functions as a thin client in communication over a network 112 with a cloud gaming provider 114. In such an implementation, generally speaking, the cloud gaming provider 114 maintains and executes the video game being played by the user 102. The computer 106 transmits inputs from the HMD 102, the interface object 104 and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a haptic/vibration feedback command is provided to the interface object 104.

In some implementations, the HMD 102, interface object 104, and camera 108, may themselves be networked devices that connect to the network 112, for example to communicate with the cloud gaming provider 114. In some implementations, the computer 106 may be a local network device, such as a router, that does not otherwise perform video game processing, but which facilitates passage of network traffic. The connections to the network by the HMD 102, interface object 104, and camera 108 may be wired or wireless.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations.

Figure 1B:
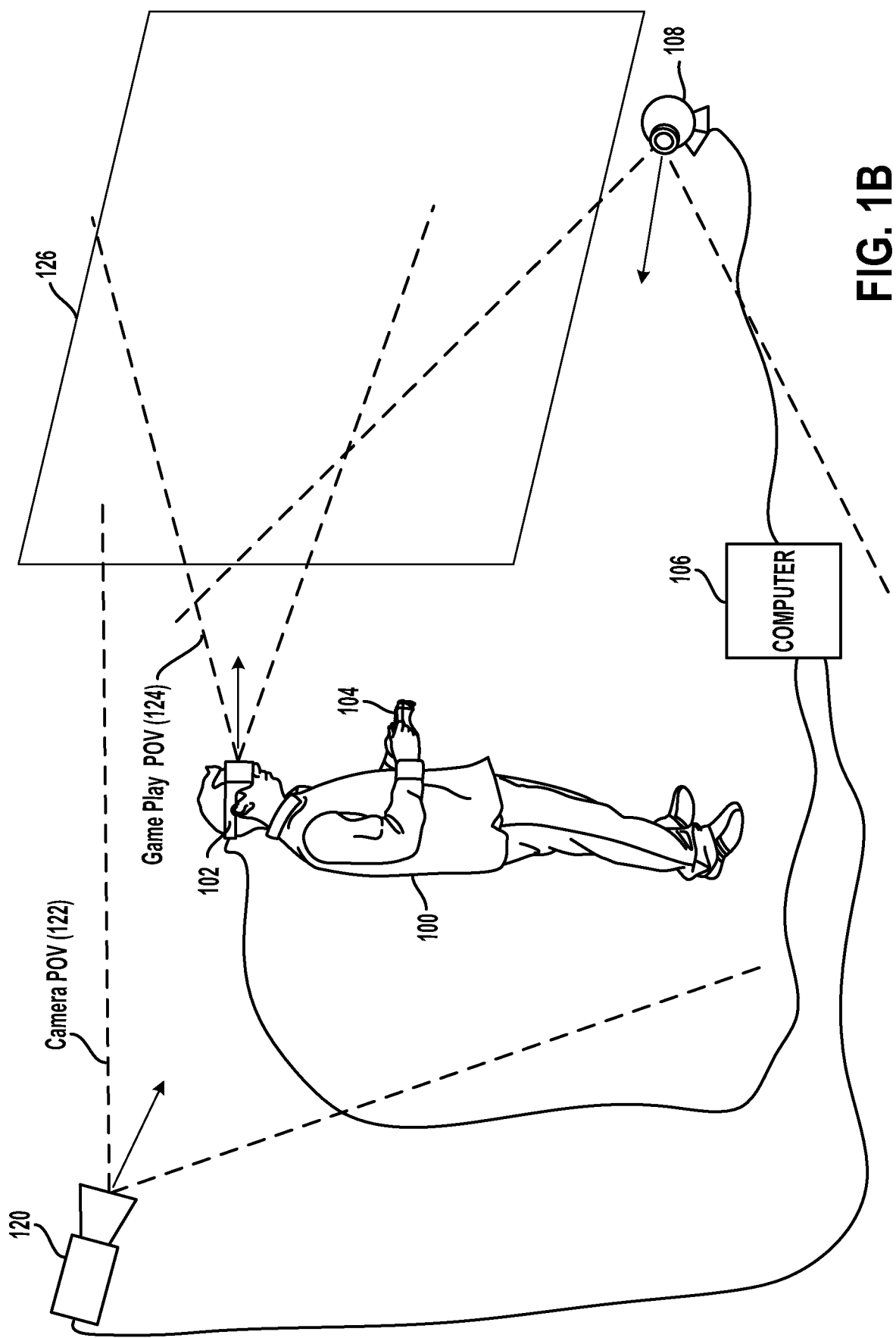
FIG. 1B illustrates an embodiment of a user playing a virtual reality game in a virtual environment via a head-mounted display (HMD) in front of a green screen 126, in accordance with implementations of the disclosure.

FIG. 1B illustrates an embodiment of a user 100 playing a virtual reality game in a virtual environment via a head-mounted display (HMD) 102 in front of a green screen 126. The HMD 102 is connected to computer 106 through a wired connection. In other implementations, HMD 102 can be connected to computer 106 wirelessly. The user 100 is shown playing a video game using interface objects 104 which provides input to the game. A rear camera 120 is connected to computer 106 through a wired connection. In some embodiments, rear camera 120 may be wireless. Rear camera 120 is positioned behind the user 106 at a fixed position and angle. The position of the rear camera 120 is generally located in a spatial three-dimensional coordinate in the room where game play is occurring. As used herein, the point of view is taken from a spatial position that an angle and direction. Rear camera 120 can be configured to record user 100 playing a virtual reality game while the user is immersed in an interactive environment. Rear camera 120 includes a camera point of view (POV) 122 that captures any objects within the POV. For example, as shown in FIG. 1B, when the rear camera 120 is recording, rear camera 120 can capture user 100 and the green screen 126 since they are within the camera POV 122.

FIG. 1B also illustrates a camera 108 being connected to computer 106 through a wired connection. Camera 108 can be configured to capture images of the interactive environment in which the user 100 is located. During game play, user 100 is positioned in front of a green screen 126. The green screen 126 can be implemented to help capture the user's 100 body, objects being held or worn (e.g., HMD and/or controllers) that are associated with the user 100. By way of example, after recording is complete, the green screen 126 can be digitally removed from the camera video 206, leaving the body of user 100, the HMD, and controllers in the camera POV 122. In other implementations, green screen 126 can be other colors. These colors may include bright blue or other hues that differ greatly from human skin tones and those that are not usually found in clothing. Game play POV 124 provides a viewpoint of what the user 100 is seeing through the HMD 102. For example, the game play POV 124 can provide a viewpoint of the virtual environment that user 100 is presently in such that a third-party can perceive the same virtual experience.

Figure 1C:
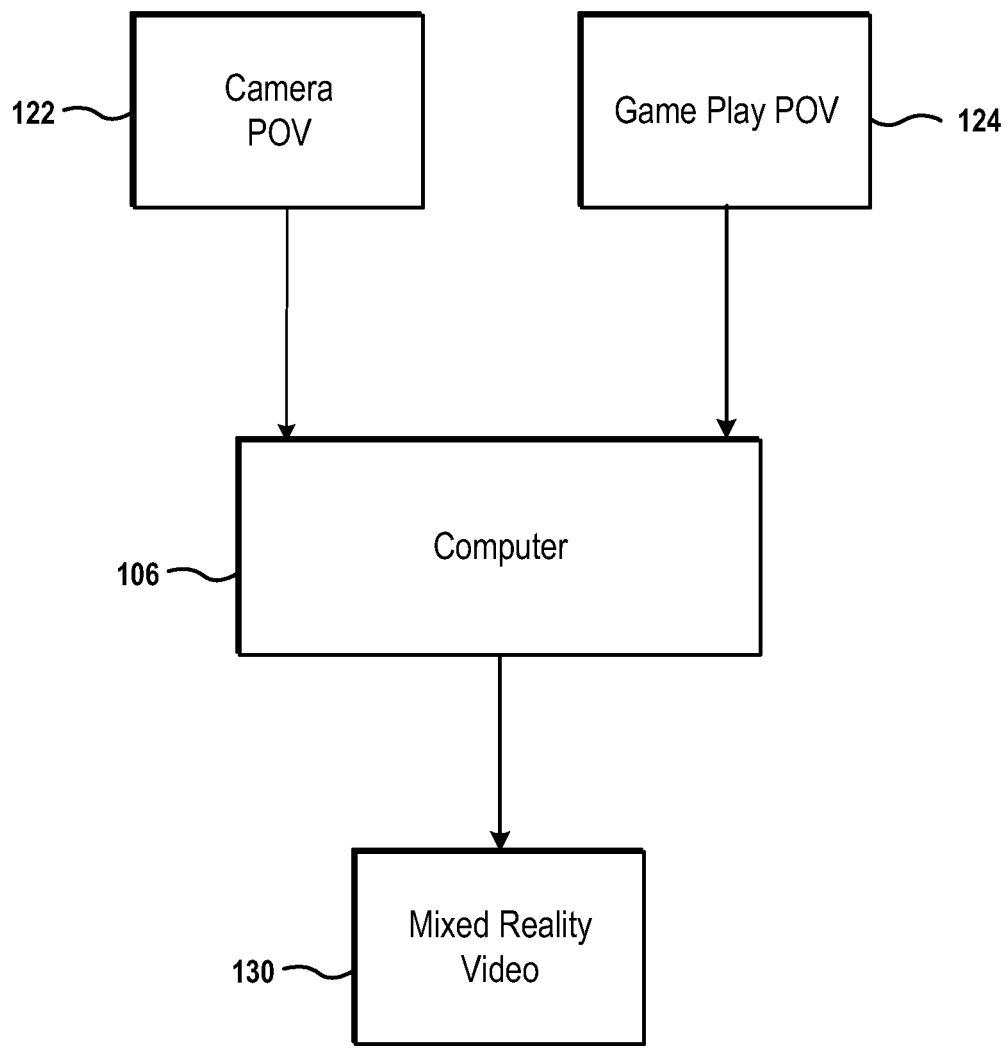
FIG. 1C illustrates an overall flow of a method for rendering a mixed reality video, in accordance with implementations of the disclosure.

FIG. 1C illustrates an overall flow of a method for rendering the mixed reality video 130. The method includes sending the camera POV 122 and game play POV 124 to the computer 106. After receiving camera POV 122, computer 106 may process and digitally remove the green screen 126 of the camera POV 122. Upon receiving the game play POV 124, computer 106 replays the game play POV 124 and using recorded metadata can make adjustments to substantially align the game play POV 124 with the camera POV 122. In alternate embodiments, instead of aligning the game play POV 124 to the camera POV 122, the game play POV 124 can be set a one or more angles that provide specific views into the game environment. Computer 106 then renders the mixed reality video by compositing the adjusted game play POV 124 and the camera POV 122.

It should be understood that the embodiments described herein may operate in a number of alternative ways. By way of example, FIG. 2A will illustrate an example where a game play POV video 208 is recorded along with the metadata 210, while only the metadata is needed to generate the adjusted camera POV video 214. In the example of FIG. 2B, it is shown that the game play POV video 208 is not recorded at all, and only the metadata 210 is recorded and used to generate the adjusted camera POV video.

Figure 2A:
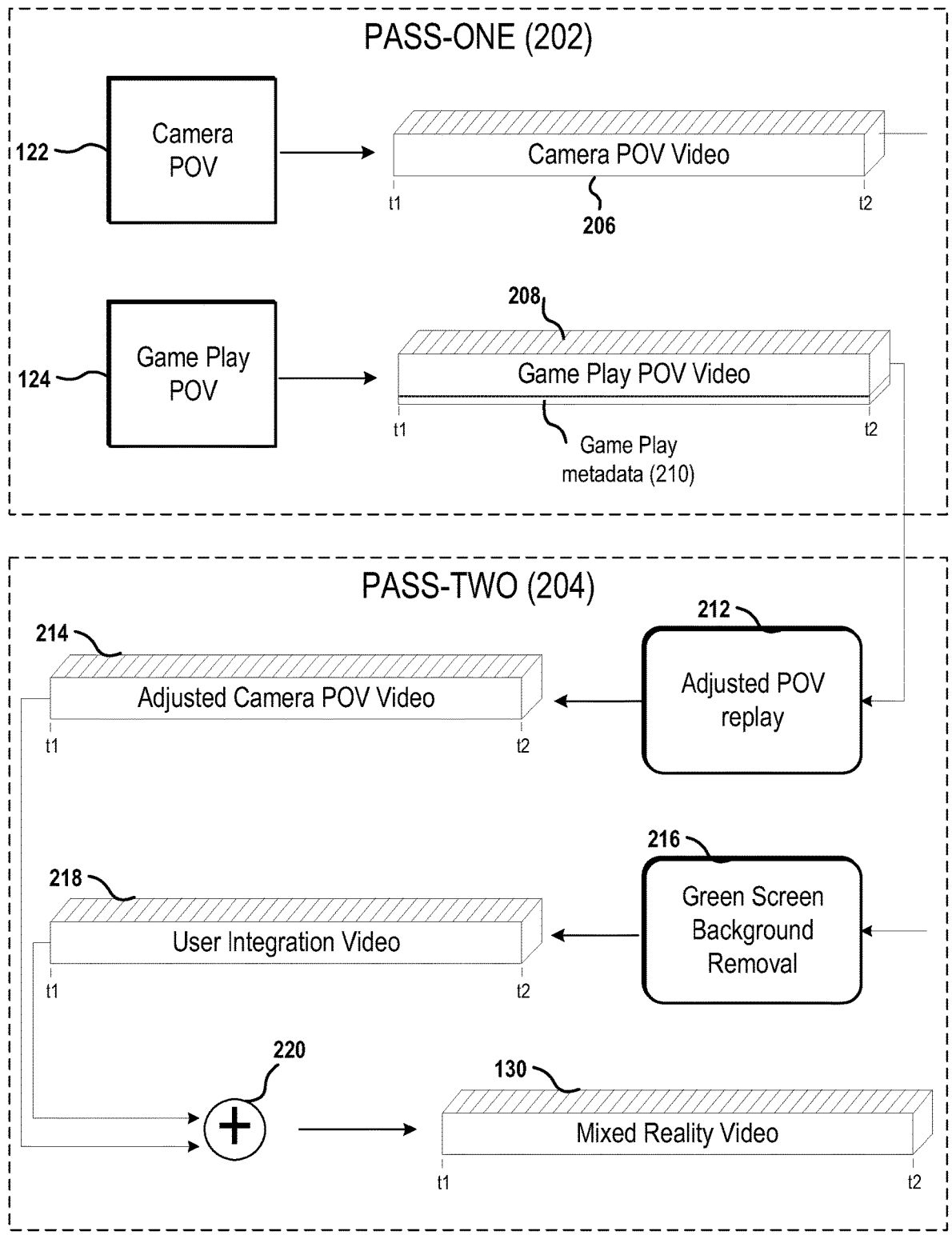
FIG. 2A illustrates an overall flow of a two-pass approach to render a mixed reality video, in accordance with implementations of the disclosure.
Figure 2B:
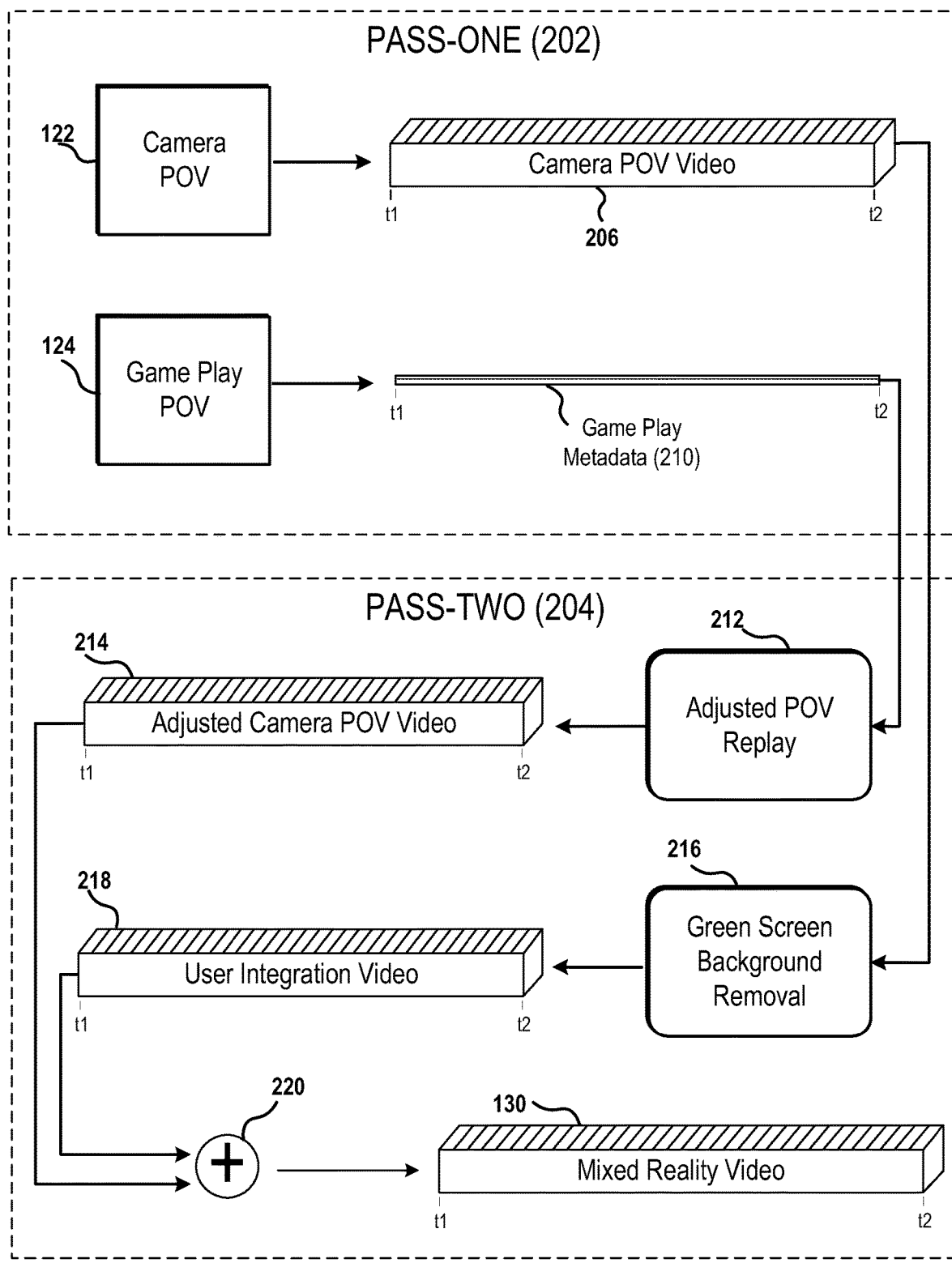
FIG. 2B illustrates another embodiment of a two-pass approach using camera POV video and game play metadata to render a mixed reality video, in accordance with implementations of the disclosure. In this embodiment, the user's game play video is not recorded.

FIG. 2A illustrates an overall flow of the two-pass approach to render a mixed reality video. In this implementation, a single computer 106 can be used to render the mixed reality video. In the two-pass approach, the method includes two stages, pass-one 202 and pass-two 204. During pass-one 202, rear camera 120 captures the camera POV 122 to create the camera POV video 206. The contents of the camera POV video 206 can include footage of the user's 100 game play performance (e.g., movements in the real world), green screen 126, and any other subjects captured within the camera POV 122. In some instances, the length of the camera POV video 206 may vary depending on how long the user 100 decides to play, how long it takes to complete a gaming session, or whenever the rear camera 108 is turned off. In this example, camera POV video 206 begins and ends at time $t_1$ and $t_2$, respectively.

Pass-one 202 may also include game play POV video 208 that is captured by the game play POV 124. The game play POV 124 may include footage of the virtual environment that the user 100 is viewing through the HMD 102. The length of the game play POV video 208 may also vary in time depending on the game session. In this example, game play POV video 208 may begin and end at time $t_1$ and $t_2$, respectively. In one embodiment, the game play POV video 208 additionally includes game play metadata 210. The game play metadata 210 may include coded information, such as state data that identifies all of the actions, inputs, and moves made by the user 100 during user's 100 game play session. The inputs, by way of example, may also include all controller inputs, e.g., button presses, selections, inertial data, directional movements, etc. The state data may also include game seed data, e.g., generated by the game during the game play session, to create background features, content, AI characters, and other unique content. The seed data, by way of example, can be used in order to replay the game in substantially the same state and environment as the original game play that produced the game play POV video.

In one embodiment, the game play metadata 210 allows the user's 100 game session to be replayed one or more times in a replay mode from another point of view, e.g., virtual camera view into the virtual environment. By way of the example, in the replay mode, the system executes the game again and uses the game play metadata to cause the game to automatically progress through the game without user input (i.e., using inputs from the metadata). As the game is re-executed automatically, the state data is used so that the replay substantially matches the user's actions, views into the game scenes, points scored, actions taken, and generally progression, but with an adjusted point of view. As noted above, computer 106 executes pass-one before proceeding to execute pass-two 204.

Pass-two 204 can be executed by computer 106 after pass-one 202 or at any time thereafter. In pass-two 204, the method includes performing the green screen background removal 216 from the camera POV video 206. At green screen background removal 216, green screen 126 can be digitally removed from the video to create the user integration video 218. In some embodiments, the processing used to remove the green screen may include processing for chroma key compositing, chroma keying, color keying, color-separation overlay, and/or other processes. The user integration video 218 may include footage of the user 100 playing the game captured within the camera POV 122 and any other objects captured within the camera POV 122.

In pass-two 204, the method includes replaying the game play POV video 208 at an adjusted POV replay 212. In one embodiment, the adjusted POV replay 212 adjusts the game play POV video 208 so that it substantially aligns with the camera POV video 206. As noted above, rear camera 120 may a have a fixed coordinate location and accordingly camera POV 122 may also be fixed. During the user's 100 game play, the user 100 may make various movements while interacting with the game. These movements may result in the game play POV 124 being misaligned with the camera POV 122. Accordingly, the adjusted POV replay 212 is configured to adjust the game play POV video 208 so that it substantially aligns with the camera POV video 206. As described above, the replay mode is used to cause re-execution of the game code, using the game play metadata, so that the user's actions are recreated and captured from a new POV. The new POV results in an adjusted camera POV video 214.

Pass-two 204 further includes a compositing 220 operation that serves to render the adjusted camera POV video 214 and the user integration video 218 by compositing the two video files. Once the compositing 220 of the video files are completed, the mixed reality video 130 is rendered and available for viewing.

In accordance with another embodiment, FIG. 2B illustrates an overall flow of the two-pass approach to render a mixed reality video using the camera POV video 206 and the game play metadata 210 obtained from the game play POV 124. Similarly, as noted above, the two-pass approach includes two stages; pass-one 202 and pass-two 204. The computer 106 first executes pass-one 202 before proceeding to execute pass-two 204. During pass-one 202, rear camera 120 captures the camera POV 122 to create the camera POV video 206. Pass-one 202 may also include the game play metadata 210 that is captured by the game play POV 124. As discussed above, the game play metadata 210 may include coded information, such as state data that identifies all of the actions, inputs, and moves made by the user 100 during user's 100 game play session. The state data may also include game seed data that can be used to replay the game in substantially the same state and environment as the original game play. The system can use the game play metadata 210 to replay, i.e., re-execute, the user's 100 game session one or more times in a replay mode from an adjusted point of view. After executing pass-one 202, the computer 106 proceeds to execute pass-two 204.

FIG. 2B further illustrates pass-two 204 which can be executed by computer 106 at any time after pass-one 202 is executed. In pass-two 204, the method includes using the game play metadata 210 to reply, i.e., re-execute, the game session at an adjusted an adjusted POV replay 212. In one embodiment, the adjusted POV replay 212 can generate the game session video from one or more different point of views. Once the adjustments are made by the POV replay 212, the new POV results in an adjusted camera POV video 214.

Pass-two 204 further includes performing the green screen background removal 216 from the camera POV video 206. As noted above, the green screen background removal 216 operations can digitally remove the green screen 126 from the camera POV video 206 to create the user integration video 218. Pass-two 204 further includes a compositing 220 operation that serves to render the adjusted camera POV video 214 and the user integration video 218 by compositing the two video files. Once the compositing 220 of the video files are completed, the mixed reality video 130 is rendered and available for viewing.

With the embodiment of FIG. 2A in mind, it should be understood that recording the game play POV video 208 is optional, as the recorded metadata is what is used for re-execution to produce the adjusted camera POV video 214.

Figure 3A:
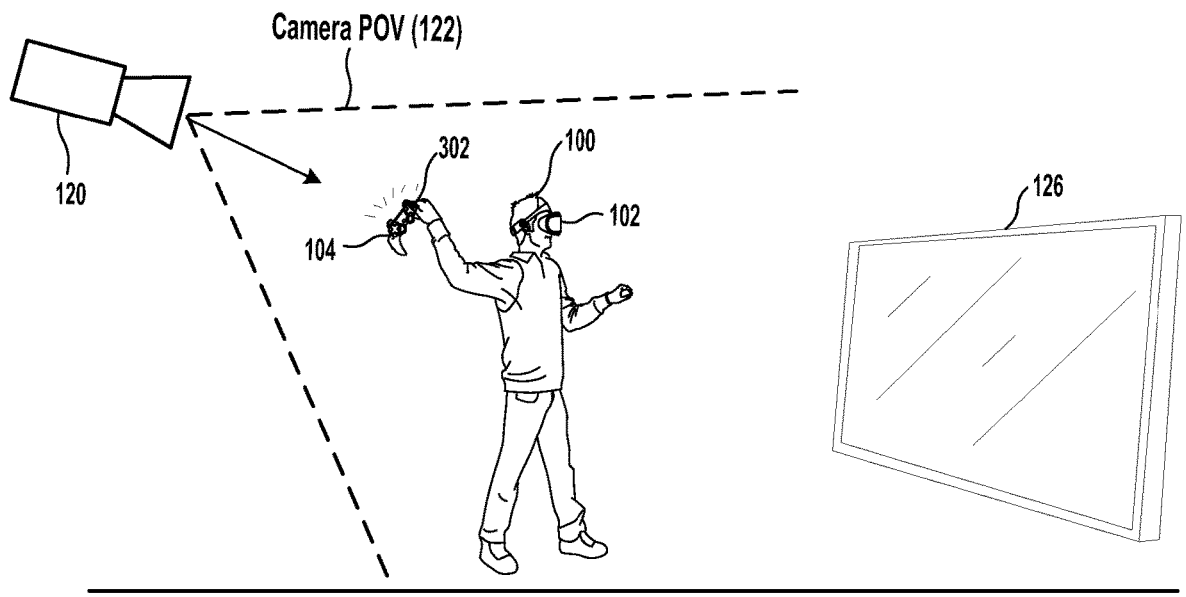
FIGS. 3A and 3B illustrates a calibration processes, in accordance with implementations of the disclosure.
Figure 3B:
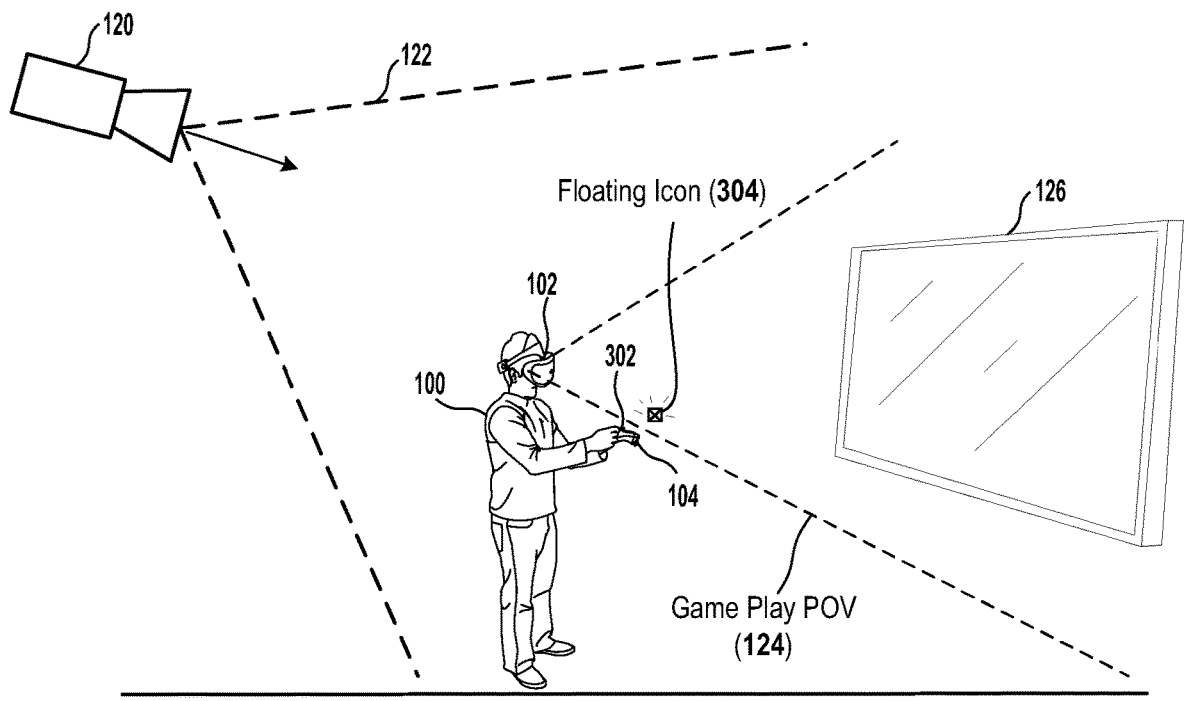

FIGS. 3A and 3B illustrate example calibration processes for the rear camera 120 with the HMD 102 and/or interface object 104. The calibration process is performed in order to identify the spatial coordinate position of the rear camera 120 that is placed behind the user 100, relative to the spatial coordinates of the HMD 102 and/or interface object 104. In one embodiment, as shown in FIG. 3A, the user 100 is shown performing the calibration process by placing the interface object 104 within the proximity of the rear camera 120 and selecting button 302 located on interface object 104. In another embodiment, it is possible for the rear camera 120 to be a stereo camera, which enables it to determine its position in the room relative to the HMD 102 or the interface object 104.

In another embodiment, as shown in FIG. 3B, the user 100 can perform the calibration process in the virtual environment space. For example, when the user 100 views the virtual environment through the HMD 102, a floating icon 304 may appear in space and prompt the user 100 to move the interface object 104 to the corresponding location. In one embodiment, the user 100 can complete the calibration process by selecting the floating icon 304 by pressing on the button 302 located on the interface object 104. Generally, the calibration process can be carried out before starting game play during pass-one 202, during game play in pass-one 202, or a combination of before and during game play of pass-one 202.

Figures 1, 4A:
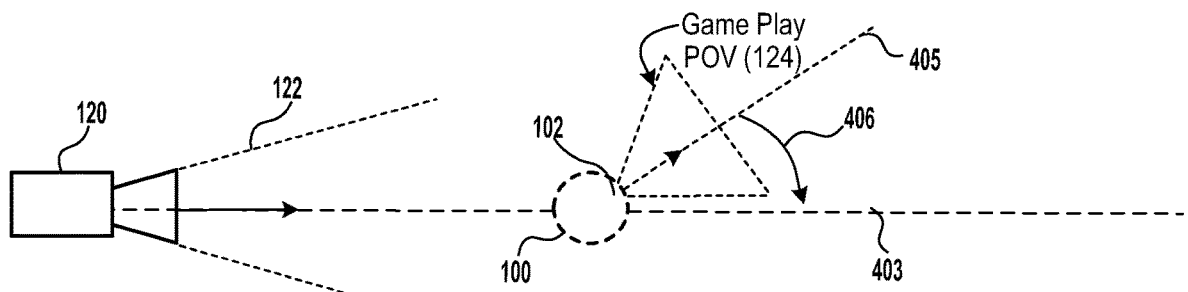
FIGS. 4A-1 through 4B-2 illustrates an alignment process, in accordance with implementations of the disclosure.
Figures 2, 4A:
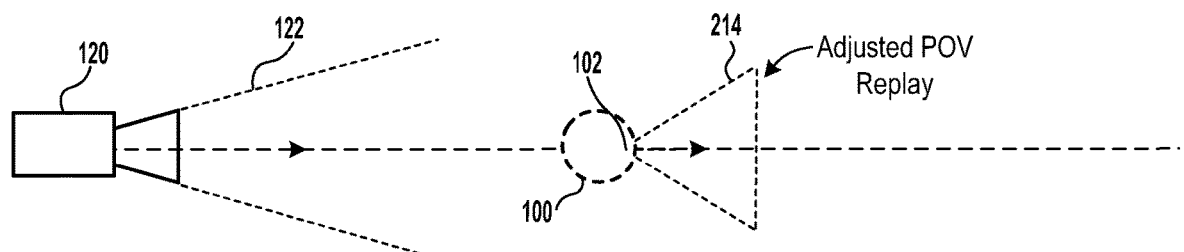

FIGS. 4A-1 through 4A-2 illustrate the alignment process. As noted above, alignment process includes causing a replay of the game play session with an adjustment to the game play POV 124 to substantially align with the camera POV 122. The replay mode re-executes the game code, using the game play metadata, so that the user's 100 actions are re-created and the camera POV 122 is adjusted to create a new POV to achieve the desired viewpoint of the user 100. FIGS. 4A-1 through 4A-2 are top views looking down at the user 100, camera POV 122, game play POV 124, and the relative orientations of the game play POV 124. In one embodiment, as shown in FIG. 4A-1, the user 100 is shown wearing the HMD 102 during game play.

During game play, the user 100 causes the game play POV 124, which may be misaligned with camera POV 122, which results in a game play POV angle 406. The game play POV angle 406 is the angle formed between a camera POV reference line 403 and a game play POV reference line 405. Generally speaking, the camera POV reference line 403 is generally fixed because the rear camera 120 is at a fixed coordinate location during the game play. Accordingly, during game play, the game play POV reference line 405 and the game play POV angle 406 can dynamically change throughout the game play in response to the user's 100 movements. During game play, the game play POV angle 406 can range from 0 degrees to 360 degrees. However, for this example, it is assumed that the game play POV 124 is oriented around game play POV angle 406. This assumption is made, as the user is generally facing in the direction made by angle 406 during the game play, and although there may be some deviation or movement around angle 406, most of the activity by the user's game play in along angle 406.

FIG. 4A-2 illustrates the results of the adjusted camera POV video 214 when the adjusted POV replay 212 operation makes the adjustments to game play POV 124 to substantially align it with the camera POV 122. As shown in FIG. 4A-2, the adjusted POV replay 212 operation causes the camera POV reference line 403 and the game play POV reference line 405 to be substantially aligned, resulting in the POV angle 406 being substantially minimized during the duration of the game play session. In this configuration, the alignment results in the adjusted camera POV video 214 having a viewpoint that is substantially behind and above the user's 100 shoulders. In another embodiment, substantially aligning the game play POV 124 with the camera POV 122 provides an approximate alignment that includes one or more instances of non-alignment and alignment during the mixed reality video. These instances, in one embodiment, occur since the user wearing the HMD may be moving during the HMD game play. Further, when these instances of moving occur, the user may generally facing one direction, but when facing this one direction, the user may be moving from side to side or looking from side to side, based on interaction with content presented in virtual environment provided by the HMD.

Figures 1, 4B:
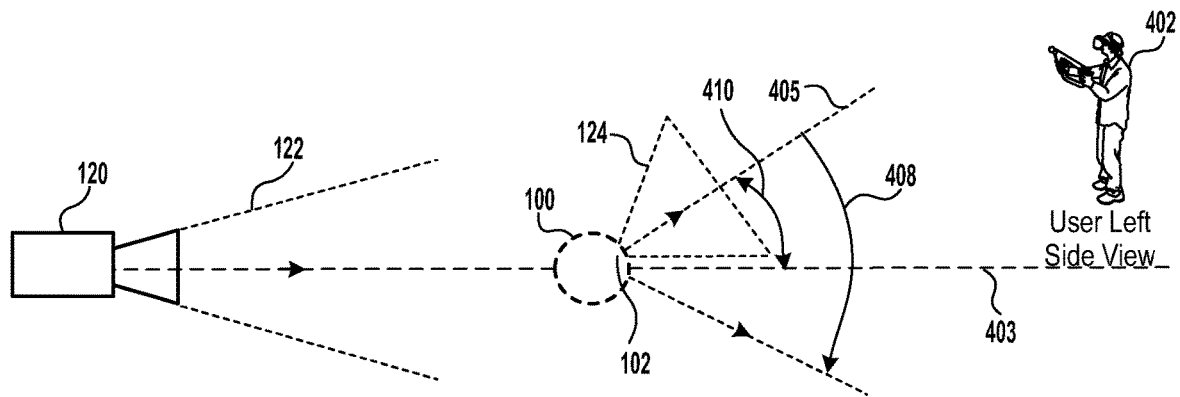
Figures 2, 4B:
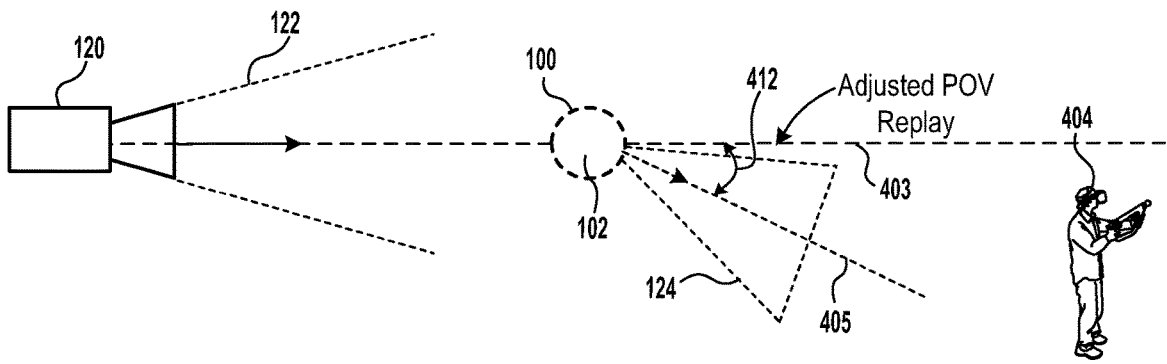

In accordance with another embodiment, the adjusted POV replay 212 operation can cause the game play POV 124 to be adjusted to achieve a side view of the user 100 (e.g., a view offset). As shown in FIG. 4B-1, a user's left side view 402 can be produced. To obtain this viewpoint, the adjusted POV replay 212 can adjust the game play POV 124 so that a user left side view angle 410 is formed between the camera POV reference line 403 and the game play POV reference line 405. As such, the camera POV 122 and the game play POV 124 are intentionally misaligned so that the camera POV 122 captures the user left side view 402. The user left side view angle 410 may vary according to the desired viewpoint of the user's left side view 402. For example, a smaller left side view angle 410 can result in a point of view that includes both the user's back and left side of the user's body. Whereas a larger left side view angle 410 can result in a view of only the user's left side and/or the user's front side.

In accordance with another embodiment, the adjusted POV replay 212 operation can cause the game play POV 124 to be adjusted to achieve a user right side view 404. As illustrated in FIG. 4B-2, the adjusted POV replay 212 operation can adjust the game play POV 124 so that a user right side view angle 412 is formed between the camera POV reference line 403 and the game play POV reference line 405. Accordingly, the camera POV 122 and the game play POV 124 are misaligned so that the camera POV 122 captures the user right side view 404. The user right side view angle 412 can vary accordingly to capture a desired point of view of the user's right side view 404. For example, a smaller right side view angle 412 can result in a viewpoint that include both the user's back and right side of the user's body. Whereas a larger right side view angle 412 can result in a view of only the user's right side and/or the user's front side.

Figure 4C:
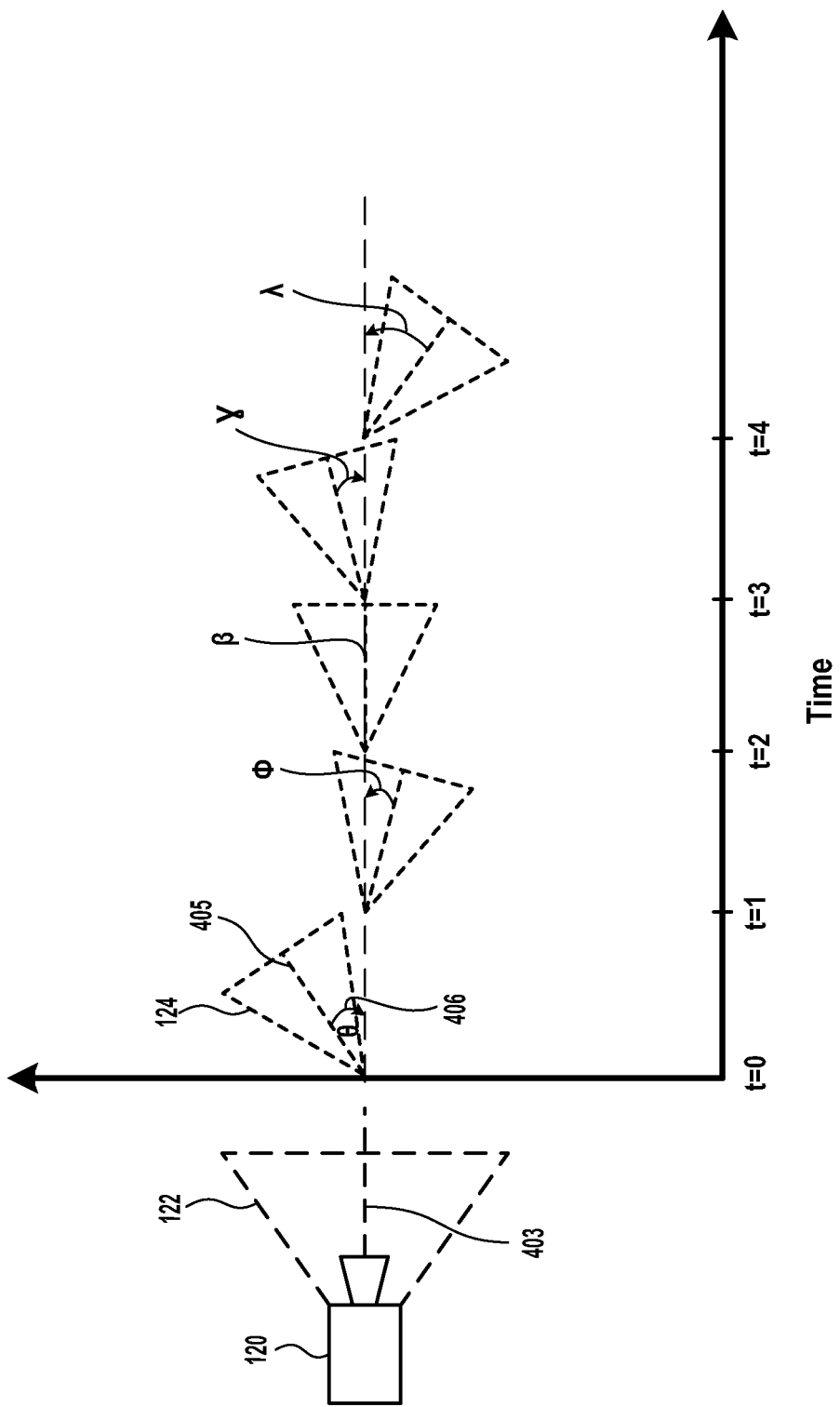
FIG. 4C illustrates the position and orientation of the game play point of view (POV) as a function of time, in accordance with implementations of the disclosure.

FIG. 4C illustrates another embodiment, where the position and orientation of the game play POV 124 as a function of time, e.g., $t_0$ through $t_4$. The rear camera 120 having a camera POV 122 is located at a fixed position behind the game play POV 124. The figure illustrates the orientation of the game play POV 124 at different time periods in relation to the camera POV 122. For example, at time $t_0$, the game play POV 124 is oriented such that the game play POV angle 406, θ, is formed between the camera POV reference line 403 and the game play POV reference line 405. Accordingly, at time $t_0$, the adjusted POV replay 212 operation can adjust the game play POV 124 by minimizing the game play POV angle 406, θ, so that the game play POV 124 and the camera POV 122 are substantially aligned. Similarly, as shown in the figure, at time $t_1$ through $t_4$, the game play POV 124 can be oriented in a variety of positions and angles.

As shown in FIG. 4C, at time t1, the game play POV 124 can be adjusted by Φ toward substantial alignment with the camera POV reference line 403. At time t2, the game play POV 124 can be adjusted by β toward substantial alignment with the camera POV reference line 403. At time t3, the game play POV 124 can be adjusted by γ toward substantial alignment with the camera POV reference line 403. At time t4, the game play POV 124 can be adjusted by λ toward substantial alignment with the camera POV reference line 403. It should be understood, that during a particular session, it may be possible to continually adjust the angle toward alignment with the camera POV reference line 403, based on the user's interactivity and movement in the virtual environment. In some embodiments, the number of angle adjustments can be more or less. By way of example, the angle adjustments can be made at each second interval, at every other second interval, at every few seconds interval, after 30 second intervals, after 60 second interval. In this embodiment, the replay process, with the adjusted angle, will occur for each interval.

Figure 5A:
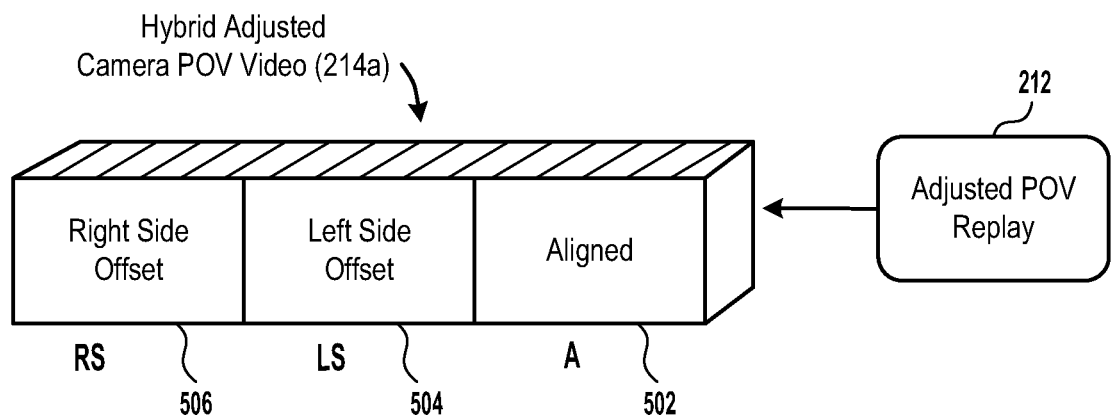
FIG. 5A and FIG. 5B illustrates hybrid adjusted camera point of view (POV) videos, in accordance with implementations of the disclosure.
Figure 5B:
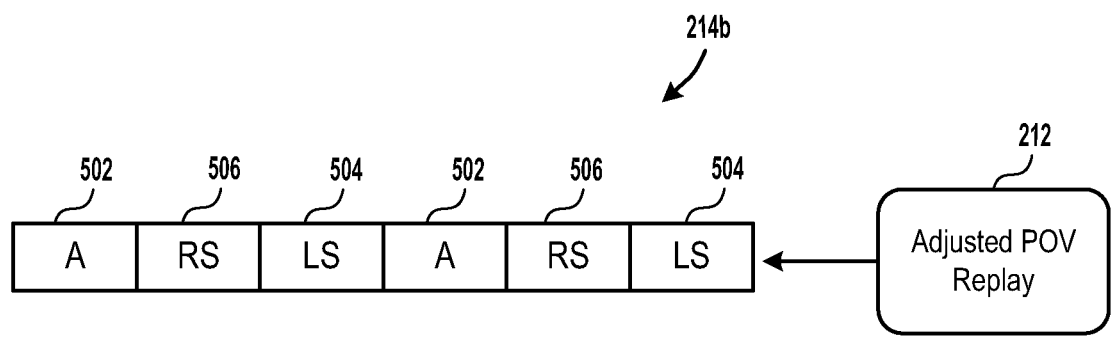

FIG. 5A and FIG. 5B illustrate a hybrid adjusted camera POV video 214a video which results after the adjusted POV replay 212 operation adjusts the game play POV video 208. In one embodiment, it is possible to adjust the game play POV video 208 to create several different viewpoints into the game play. In one embodiment, as shown in FIG. 5A, the hybrid adjusted camera POV video 214a includes three different viewpoints: aligned segment 502, left-side offset segment 504, and right-side offset segment 506. The aligned segment 502 is created when the adjusted POV replay 212 operation adjusts the game play POV video 208 to substantially align with the camera POV video 206. The aligned segment 502 provides viewers with viewpoint that is substantially behind and above the user's 100 shoulders.

In addition, the left-side offset segment 504 is created when the adjusted POV replay 212 operation adjusts the game play POV video 208 so that it is misaligned with the camera POV video 206. This misalignment causes the formation of the user left side view angle 410 as discussed above with reference to FIG. 4B-1. Since the game play POV video 208 and the camera POV video 206 are misaligned, the user's 100 left side is exposed and captured by the camera POV video 206. Similarly, the right-side offset segment 506 is created when the adjusted POV replay 212 operation adjusts the game play POV video 208 so that it is misaligned with the camera POV video 206. This misalignment results in the formation of the user right side view angle 412 as discussed above with reference to FIG. 4B-2. Since the game play POV video 208 and the camera POV video 206 are misaligned, the user's 100 right side is exposed and captured by the camera POV video 206.

In another embodiment, a hybrid adjusted camera POV video 214b can include a plurality of video segments. As shown in FIG. 5B, the adjusted POV replay 212 operation can adjust the game play POV video 208 to create the aligned segment 502, right-side offset 506, left-side offset segment, or any other combination thereof. In accordance with this embodiment, it is possible to create a mixed reality video that has the camera view into the game moving to capture specific interesting viewpoints, and not just the view from behind the user. The left, right and aligned views can be automatically determined based on the content of the video game, and action detected in the game, or can be manually selected.

Figure 6A:
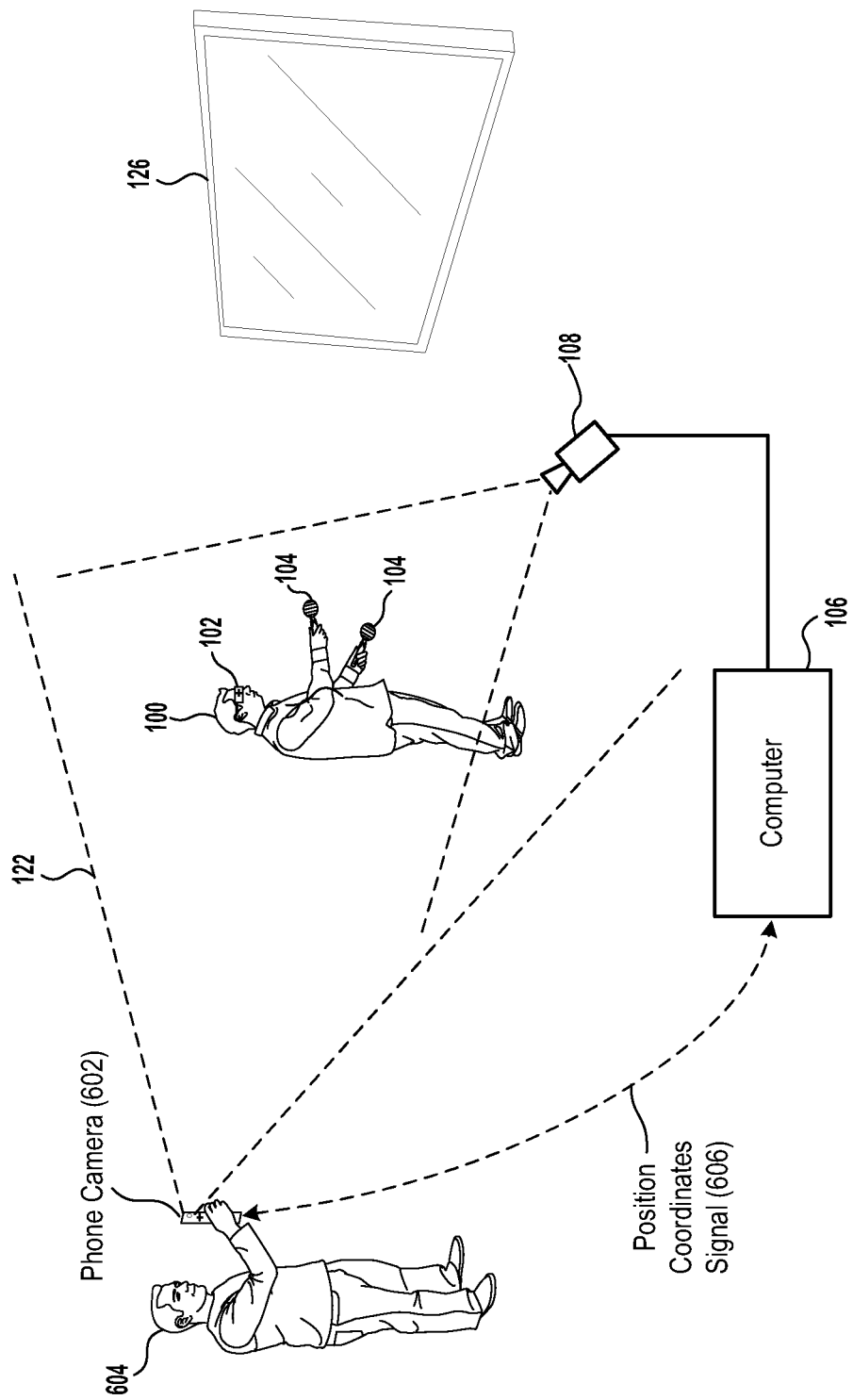
FIG. 6A illustrates a spectator using a cell phone camera to record a user's game play, in accordance with implementations of the disclosure.

FIG. 6A illustrates an embodiment of a spectator 604 using a cell phone camera 602 in lieu of the rear camera 120 to record the user 100 during game play. In this embodiment, user 100 is shown playing a virtual reality game in a virtual environment via the HMD 102 in front of the green screen 126. In one embodiment, at the start of game play, calibration can be performed in order to identify the spatial coordinate position of the cell phone camera 602 relative to the spatial coordinates of the HMD 102 and/or the interface object 104. The cell phone camera 602 and the computer 106 can communicate wirelessly by sending a position coordinate signal 606 to each other. This enables the calibration of the cell phone camera 602 and the game play POV video 208 so that the video captured by the cell phone camera 602 and the game play POV video 208 are in sync. In other embodiments, the calibration can be performed by synching the audio captured by the cell phone camera 602 with the audio from the game play POV video 208.

In one embodiment, during game play, the spectator 604 is positioned behind the user 100 while recording the user's 100 game play. In other embodiments, the spectator 604 can be recording the user 100 from any position around the periphery of the user 100. For example, while recording the user's 100 game performance, the spectator can move around the periphery of the user to capture the user's performance from various angles, viewpoints, and perspectives. These perspectives can include a rear view, side view, front view, or any combination of these perspective.

The cell phone camera 602 includes the camera POV 122 which captures any objects within the camera POV 122. For example, as shown in FIG. 6A, when the cell phone camera 602 is recording, the cell phone camera 602 can capture the user 100 and the green screen 126 since they are within the camera POV 122. As noted above, the HMD 102 is connected to computer 106 through a wired connection. In other implementations, HMD 102 can be connected to computer 106 wirelessly. The user 100 is shown playing a video game using interface objects 104 which provides input to the game. In addition, the camera 108 is connected to the computer 106 through a wired connection. Camera 108 can be configured to capture images of the interactive environment in which the user 100 is located.

Figure 6B:
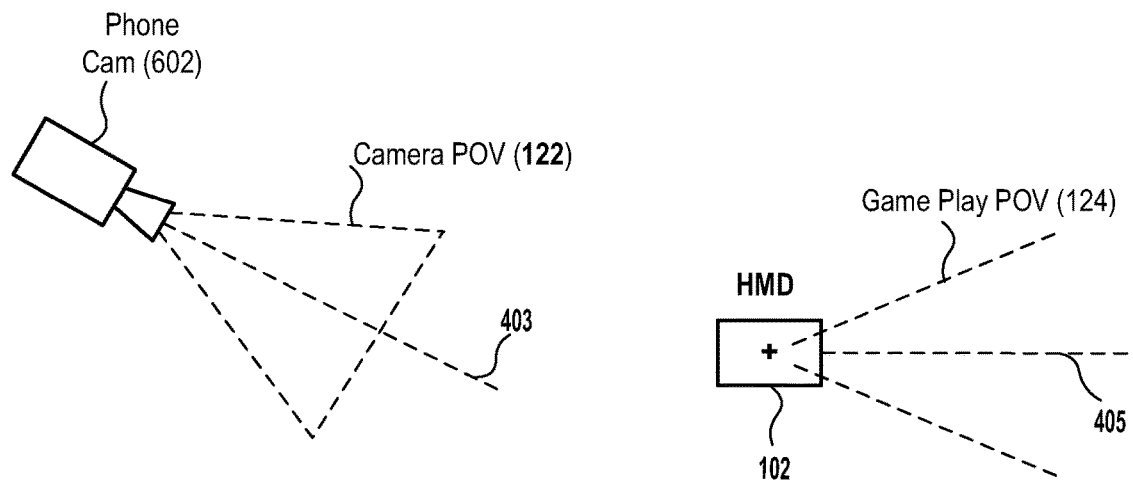
FIGS. 6B, 6C, and 6D illustrate an alignment process, in accordance with implementations of the disclosure.
Figure 6C:
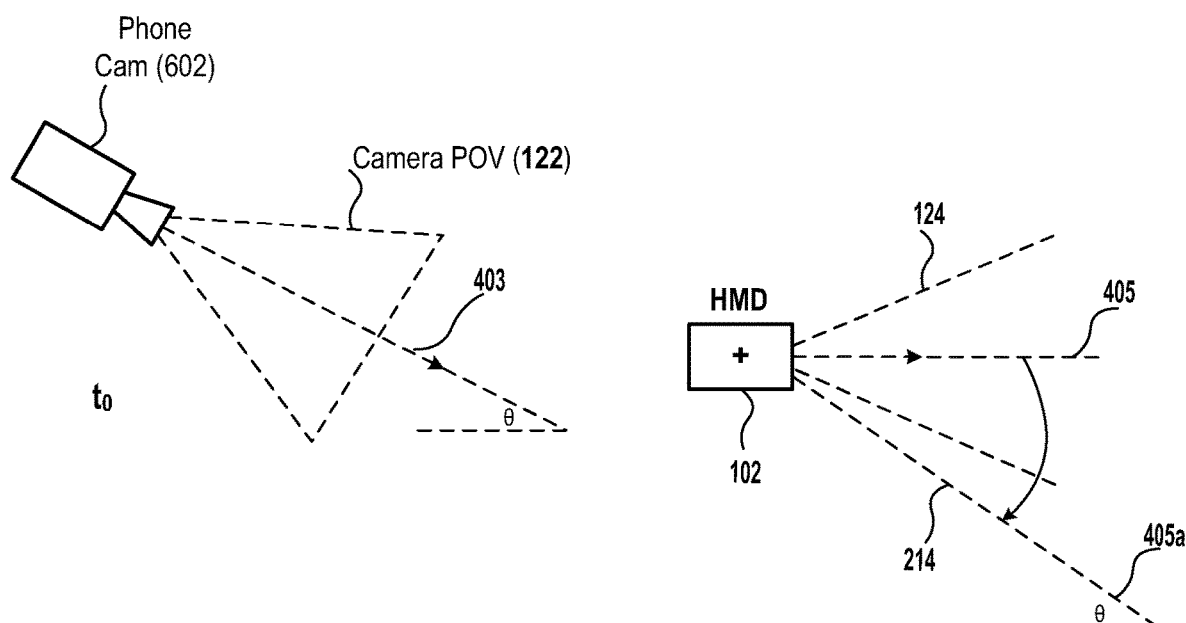
Figure 6D:
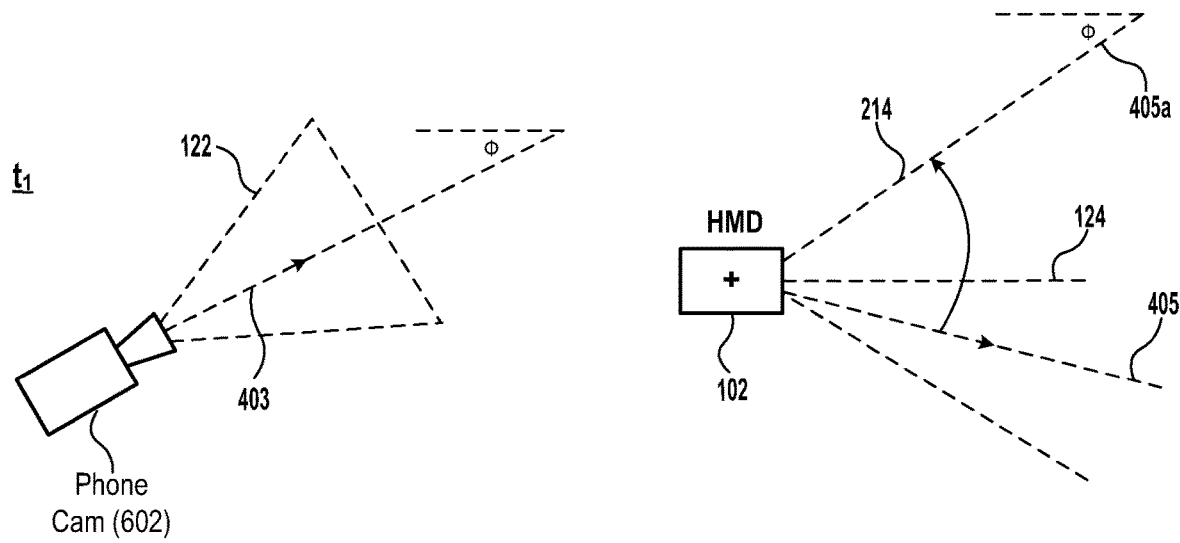

FIGS. 6B, 6C, and 6D illustrate an embodiment of the alignment process which involves adjusting the game play POV 124 to substantially align it with the camera POV 122. As shown in FIG. 6B, the cell phone camera 602 includes the camera POV 122 that captures objects within its POV. The HMD 102 is shown with the associated game play POV 124 which provides a viewpoint of what the user 100 is seeing through the HMD 102. In this embodiment, the position of the cell phone camera 602 is constantly moving over time, creating instantaneously recordable positions and angles (i.e., points of view). As shown in FIG. 6B, the camera POV 122 and the game play POV 124 are misaligned. In order to capture a point of view from that is substantially behind and above the user's 100 shoulders, the adjusted POV replay 212 can adjust the game play POV video 208 (i.e., captured by game play POV 124) so that it substantially aligns with the cell phone camera 602 video that is captured within the camera POV 122.

With reference to FIG. 6C, in one embodiment, the figure shows the position of the game play POV 124 and the camera POV 122 at the beginning of the game play recording, time $t_0$. As illustrated, the camera POV 122 is oriented such that the camera POV reference line 403 and a horizontal axis forms an adjustment angle theta, $\theta$. Accordingly, the game play POV 124 is misaligned with the camera the POV 122. To align the game play POV 124 with the camera POV 122, the adjusted POV replay 212 can adjust the game play POV 124 so that it substantially aligns with the camera POV 122. In this embodiment, the adjusted POV replay 212 can adjust the game play POV 124 such that the game play POV reference line 405a and the horizontal axis forms the adjustment angle theta, $\theta$. Once the alignment is made, at time $t_0$, the adjusted camera POV video 214 includes a viewpoint that is substantially behind and above the user's 100 shoulders.

As shown in FIG. 6D, in accordance with another embodiment, the figure illustrates the relative positions of the game play POV 124 and the camera POV 122 at time, $t_1$. As illustrated, the camera POV 122 is oriented such that the camera POV reference line 403 and a horizontal axis forms an adjustment angle phi, $\phi$. The figure also shows that the game play POV 124 is misaligned with the camera POV 122. To align the game play POV 124 with the camera POV 122, the adjusted POV replay 212 can orient the game play POV 124 so that it is substantially aligned with the camera POV 122. The adjusted POV replay 212 can adjust the game play POV 124 so that the adjustment angle phi, $\phi$, is formed between the game play POV reference line 405a and the horizontal axis. Accordingly, at time t1, the adjusted camera POV video 214 includes a viewpoint that is substantially behind and above the user's 100 shoulders.

Figure 6E:
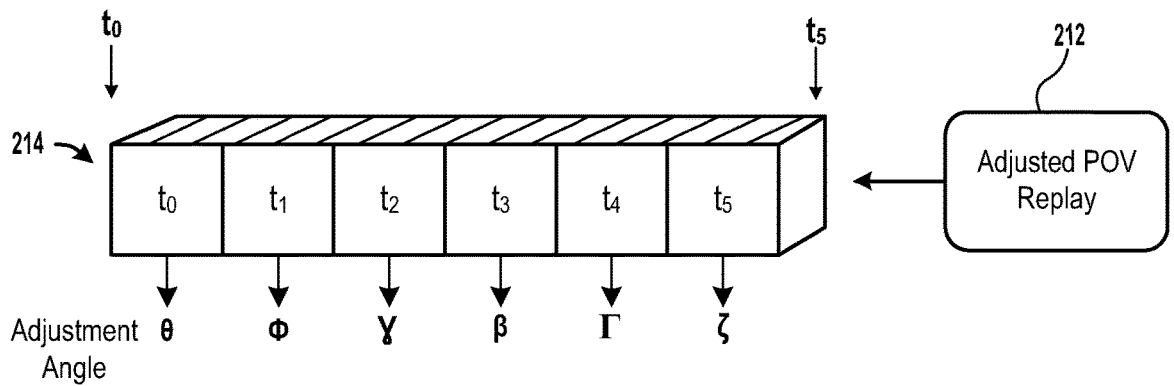
FIG. 6E illustrates an adjusted camera point of view (POV) video for various time intervals, in accordance with implementations of the disclosure.

FIG. 6E illustrates the adjusted camera POV video 214 for various time intervals, $t_0$ through $t_5$. Associated with each time segment (i.e., $t_0 \ldots t_5$), the adjusted POV replay 212 can make adjustments to the game play POV 124 so that it substantially aligns with the camera POV 122. Since the position of the cell phone camera 602 is substantially moving over time, at a given time, the camera POV 122 can be at any orientation with a corresponding adjustment angle. Accordingly, the adjusted POV replay 212 can replay the game play POV 124 and make adjustments to substantially align it with the camera POV 122. For example, FIG. 6E illustrates various adjustment angles for various periods of time. To align the game play POV 124 with the camera POV 122 for at a given time, the adjusted POV replay 212 replays the game play POV 124 and orients the game play POV 124 to form a corresponding adjustment angle (i.e., theta, phi, gamma, etc.) to match the position of the camera POV 122 at the corresponding time. Then, the adjusted replayed segments are joined to make the game play POV 124.

Figure 7:
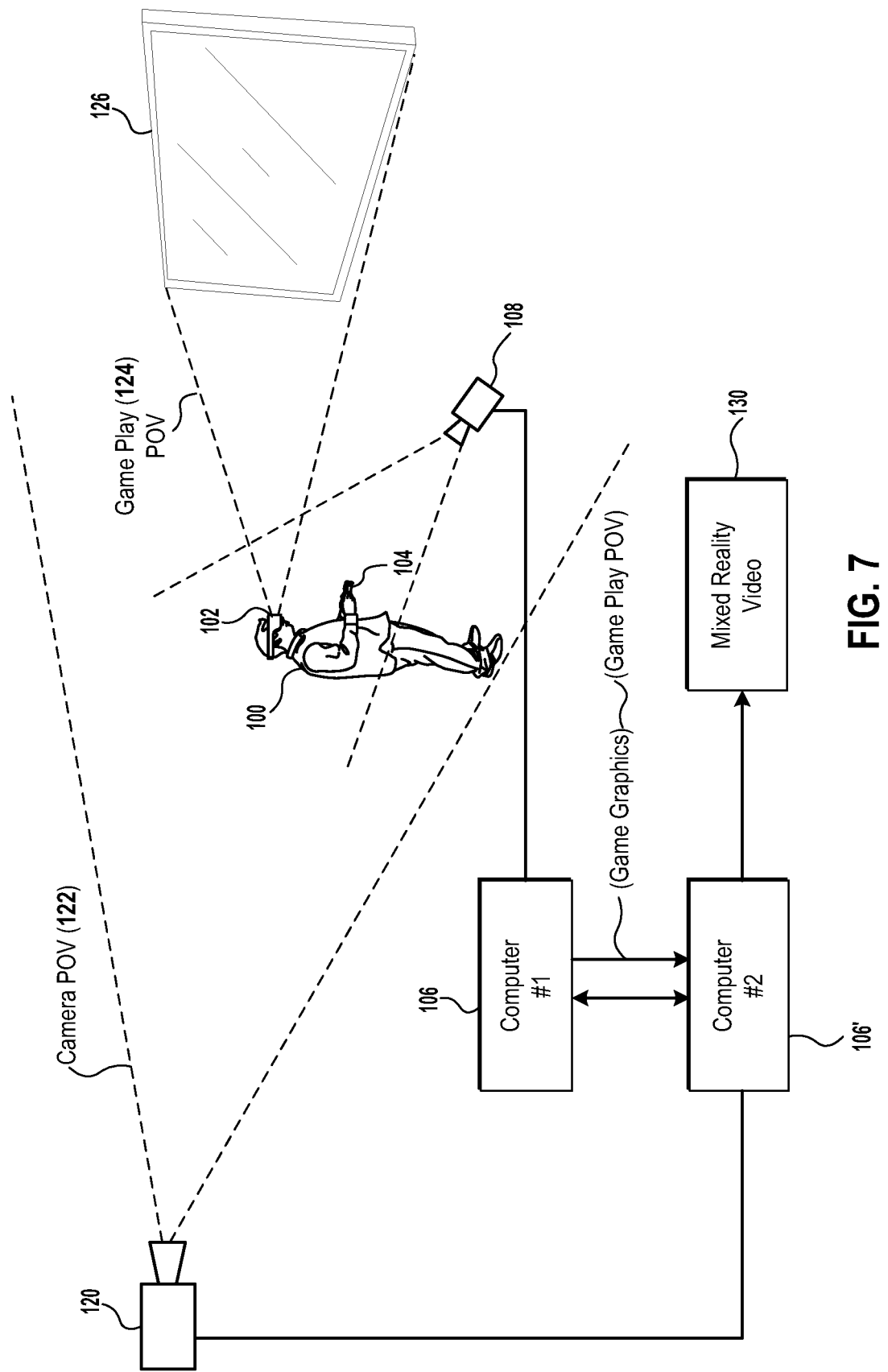
FIG. 7 illustrates an example of using two computers to render the mixed reality video, in accordance with an implementation of the disclosure.

FIG. 7 illustrates an embodiment of using two computers to render the mixed reality video 130. In the illustrated implementation, a first computer 106 is wirelessly connected to a second computer 106'. In other embodiments, the first computer 106 and the second computer 106' are connected through a wired connection. FIG. 7 further illustrates the user 100 playing a virtual reality game in a virtual environment via the HMD 102 in front of the green screen 126. The HMD 102 is connected to the first computer 106 through a wired connection. In other implementations, the HMD 102 can be connected to the fire computer 106 wirelessly. The user 100 is shown playing a video game using the interface objects 104 which controls the game play and provides input to the game. The rear camera 120 is connected to the second computer 106' through a wired connection. In some embodiments, the rear camera 120 can be wireless connected to the second computer 106'. In one embodiment, the rear camera 120 can placed behind the user 100 at a fixed position and angle. The position of the rear camera 120 is generally located in a spatial three-dimensional coordinate in the room where game play is occurring via calibration. The rear camera 120 can be configured to record the user 100 playing a virtual reality game while the user 100 is immersed in an interactive environment. The rear camera 120 includes the camera POV 122 that captures any objects within the POV. The camera 108 is connected to the first computer 106 through a wired connection. The camera 108 can be configured to capture images of the interactive environment in which the user 100 is located.

In one embodiment, the first computer 106 is used to execute the virtual reality video game. While the first computer 106 executes the virtual reality video game, the second computer 106' can receive the recording from the camera POV 122. In substantial real-time, the second computer 106' receives the game play POV 124 video and metadata from the first computer 106. Adjustments are then made to the game play POV 124 video to align it with the camera POV 122 video or some other angle, which results in the adjusted camera POV video 214. The second computer 106' can digitally remove the green screen 126 from the camera POV 122 video to create the user integration video 218. The second computer 106' then proceeds to render the mixed reality video 130 by compositing the adjusted camera POV video 214 with the integration video 218. For this embodiment, the first computer 106 and the second computer 106' work in conjunction so that the mixed reality video 130 can be rendered in a single pass rather than two. This produces the generation of the mixed reality video 130 in substantial real time, and it is possible to have a spectator watch the mixed reality video on a second screen while the HMD user is playing the game. The second screen, in one embodiment, can be shared over the internet for remote spectator viewing.

Figures 1, 8A:
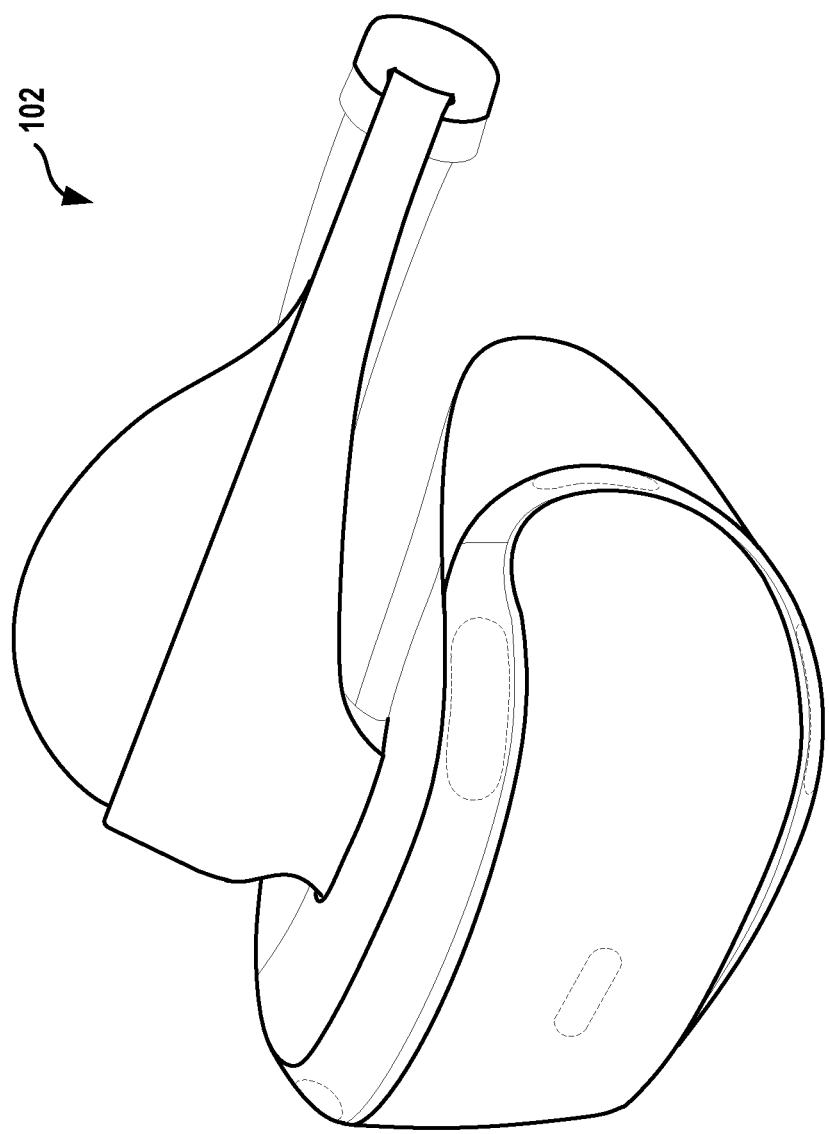
Figures 2, 8A:
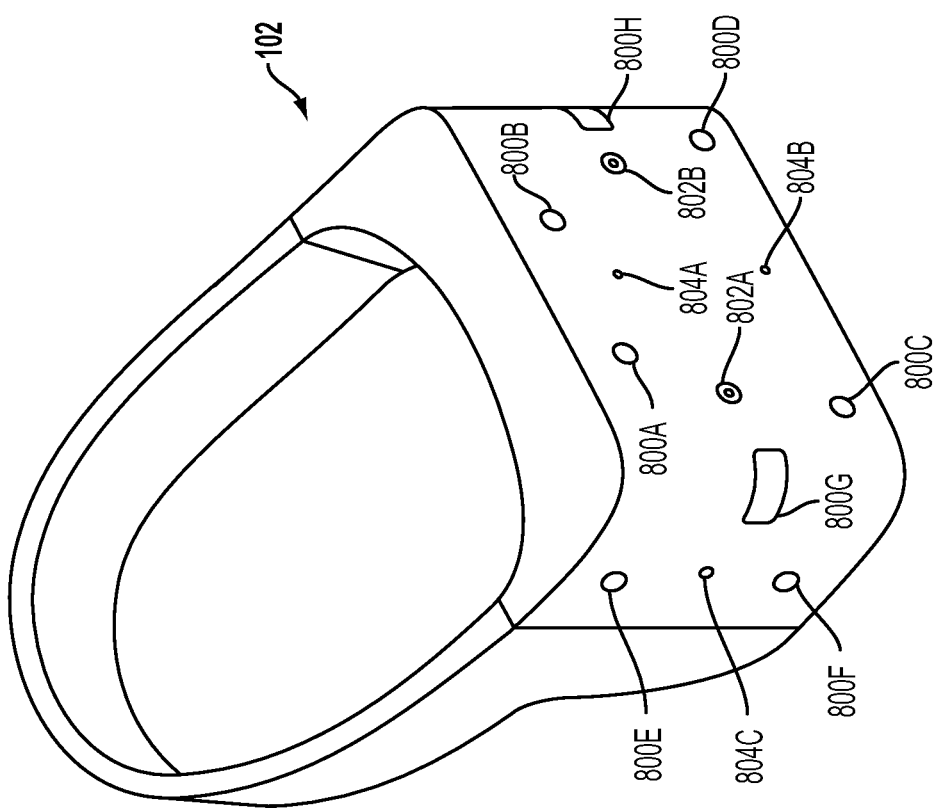

FIGS. 8A-1 and 8A-2 illustrate a head-mounted display (HMD), in accordance with an implementation of the disclosure. FIG. 8A-1 in particular illustrates the Playstation® VR headset, which is one example of a HMD in accordance with implementations of the disclosure. As shown, the HMD 102 includes a plurality of lights 800A-H. Each of these lights may be configured to have specific shapes, and can be configured to have the same or different colors. The lights 800A, 800B, 800C, and 800D are arranged on the front surface of the HMD 102. The lights 800E and 800F are arranged on a side surface of the HMD 102. And the lights 800G and 800H are arranged at corners of the HMD 102, so as to span the front surface and a side surface of the HMD 102. It will be appreciated that the lights can be identified in captured images of an interactive environment in which a user uses the HMD 102. Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 800G and 800H) may be exposed for image capture depending upon the orientation of the HMD 102 relative to the image capture device.

In one implementation, the lights can be configured to indicate a current status of the HMD to others in the vicinity. For example, some or all of the lights may be configured to have a certain color arrangement, intensity arrangement, be configured to blink, have a certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases. In this manner, a person external to the user may view the lights on the HMD 102 and understand that the user is actively engaged in intense gameplay, and may not wish to be disturbed at that moment.

The HMD 102 may additionally include one or more microphones. In the illustrated implementation, the HMD 102 includes microphones 804A and 804B defined on the front surface of the HMD 102, and microphone 804C defined on a side surface of the HMD 102. By utilizing an array of microphones, sound from each of the microphones can be processed to determine the location of the sound's source. This information can be utilized in various ways, including exclusion of unwanted sound sources, association of a sound source with a visual identification, etc.

The HMD 102 may also include one or more image capture devices. In the illustrated implementation, the HMD 102 is shown to include image capture devices 802A and 802B. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. That is, though the user cannot see through the HMD 102 in a strict sense, the video captured by the image capture devices 802A and 802B (e.g., or one or more external facing (e.g. front facing) cameras disposed on the outside body of the HMD 102) can nonetheless provide a functional equivalent of being able to see the environment external to the HMD 102 as if looking through the HMD 102. Such video can be augmented with virtual elements to provide an augmented reality experience, or may be combined or blended with virtual elements in other ways. Though in the illustrated implementation, two cameras are shown on the front surface of the HMD 102, it will be appreciated that there may be any number of externally facing cameras installed on the HMD 102, oriented in any direction. For example, in another implementation, there may be cameras mounted on the sides of the HMD 102 to provide additional panoramic image capture of the environment. Additionally, in some implementations, such externally facing cameras can be used to track other peripheral devices (e.g. controllers, etc.). That is, the location/orientation of a peripheral device relative to the HMD can be identified and tracked in captured images from such externally facing cameras on the HMD, and using the known location/orientation of the HMD in the local environment, then the true location/orientation of the peripheral device can be determined.

Figure 8B:
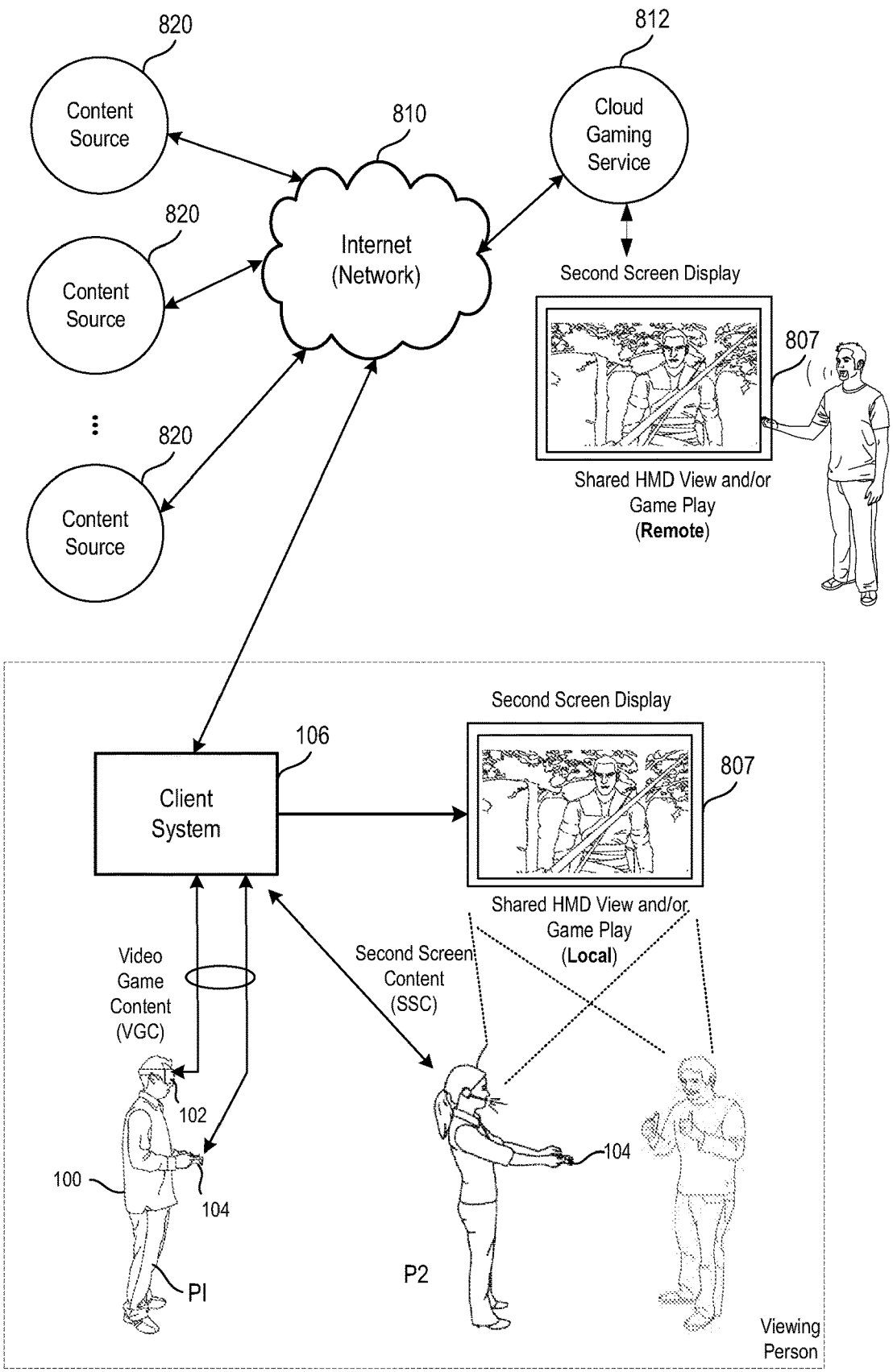
FIG. 8B illustrates one example of an HMD user interfacing with a client system, and the client system providing content to a second screen display, which is referred to as a second screen, in accordance with one implementation.

FIG. 8B illustrates one example of an HMD 102 user 100 interfacing with a client system 106, and the client system 106 providing content to a second screen display, which is referred to as a second screen 807. The client system 106 may include integrated electronics for processing the sharing of content from the HMD 102 to the second screen 807. Other implementations may include a separate device, module, connector, that will interface between the client system and each of the HMD 102 and the second screen 807. In this general example, user 100 is wearing HMD 102 and is playing a video game using a controller, which may also be interface object 104. The interactive play by user 100 will produce video game content (VGC), which is displayed interactively to the HMD 102.

In one implementation, the content being displayed in the HMD 102 is shared to the second screen 807. In one example, a person viewing the second screen 807 can view the content being played interactively in the HMD 102 by user 100. In another implementation, another user (e.g. player 2) can interact with the client system 106 to produce second screen content (SSC). The second screen content produced by a player also interacting with the controller 104 (or any type of user interface, gesture, voice, or input), may be produced as SSC to the client system 106, which can be displayed on second screen 807 along with the VGC received from the HMD 102.

Accordingly, the interactivity by other users who may be co-located or remote from an HMD user can be social, interactive, and more immersive to both the HMD user and users that may be viewing the content played by the HMD user on a second screen 807. As illustrated, the client system 106 can be connected to the Internet 810. The Internet can also provide access to the client system 106 to content from various content sources 820. The content sources 820 can include any type of content that is accessible over the Internet.

Such content, without limitation, can include video content, movie content, streaming content, social media content, news content, friend content, advertisement content, etc. In one implementation, the client system 106 can be used to simultaneously process content for an HMD user, such that the HMD is provided with multimedia content associated with the interactivity during gameplay. The client system 106 can then also provide other content, which may be unrelated to the video game content to the second screen. The client system 106 can, in one implementation receive the second screen content from one of the content sources 820, or from a local user, or a remote user.

Figure 9:
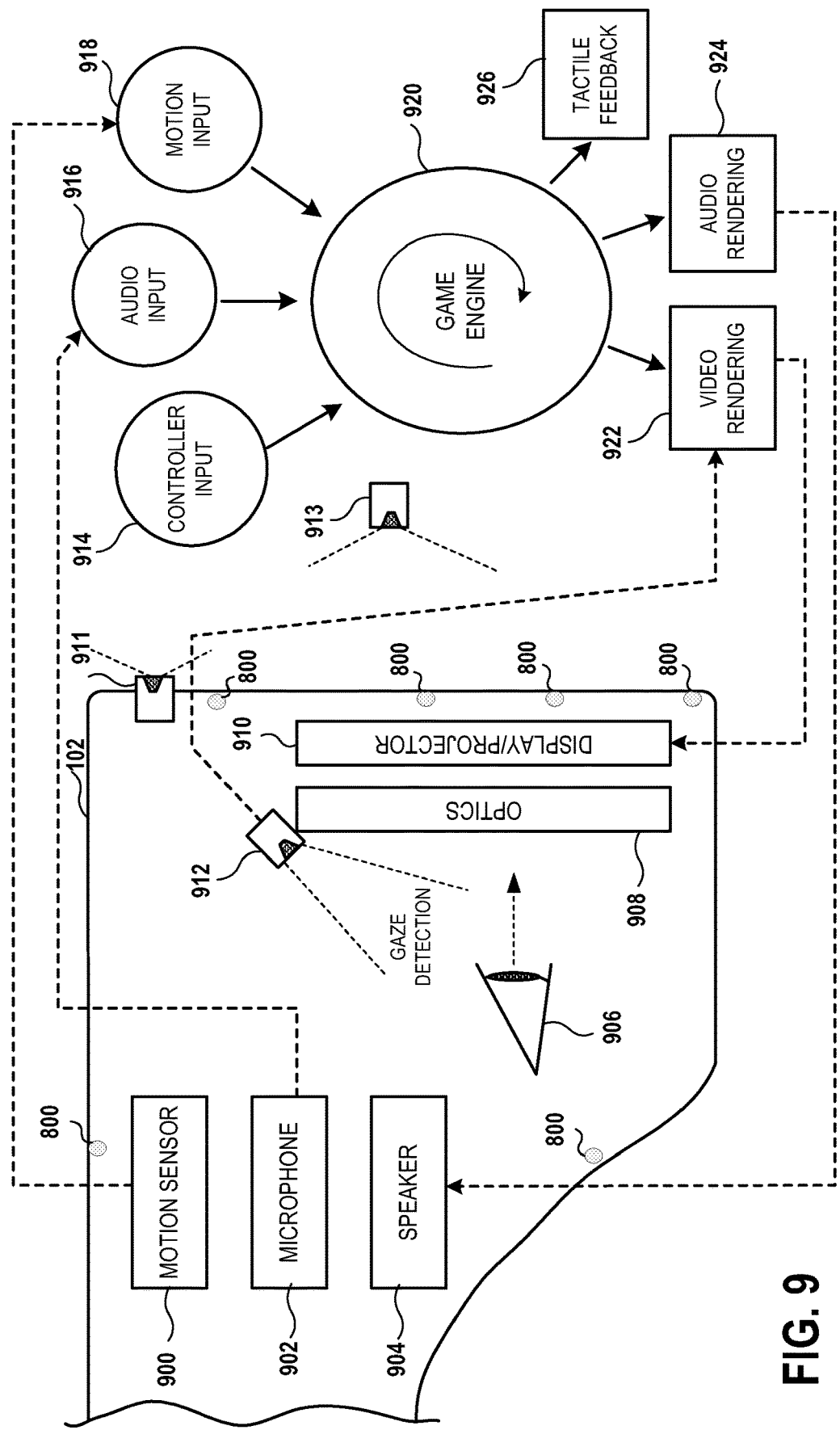
FIG. 9 conceptually illustrates the function of an HMD in conjunction with an executing video game, in accordance with an implementation of the disclosure.

FIG. 9 conceptually illustrates the function of the HMD 102 in conjunction with an executing video game or other application, in accordance with an implementation of the disclosure. The executing video game/application is defined by a game/application engine 920 which receives inputs to update a game/application state of the video game/application. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated implementation, the game engine receives, by way of example, controller input 914, audio input 916 and motion input 918. The controller input 914 may be defined from the operation of a gaming controller separate from the HMD 102, such as a handheld gaming controller (e.g. Sony DUALSHOCK®4 wireless controller, Sony PlayStation® Move motion controller) or directional interface object 104. By way of example, controller input 914 may include directional inputs, button presses, trigger activation, movements, gestures, or other kinds of inputs processed from the operation of a gaming controller. In some implementations, the movements of a gaming controller are tracked through an externally facing camera 911 of the HMD 102, which provides the location/orientation of the gaming controller relative to the HMD 102. The audio input 916 can be processed from a microphone 902 of the HMD 102, or from a microphone included in the image capture device 913 or elsewhere in the local environment. The motion input 918 can be processed from a motion sensor 900 included in the HMD 102, and/or from image capture device 913 as it captures images of the HMD 102, and/or from externally facing camera 911 of the HMD 102. The game engine 920 receives inputs which are processed according to the configuration of the game engine to update the game state of the video game. The game engine 920 outputs game state data to various rendering modules which process the game state data to define content which will be presented to the user.

In the illustrated implementation, a video rendering module 922 is defined to render a video stream for presentation on the HMD 102. The video stream may be presented by a display/projector mechanism 910, and viewed through optics 908 by the eye 906 of the user. An audio rendering module 904 is configured to render an audio stream for listening by the user. In one implementation, the audio stream is output through a speaker 904 associated with the HMD 102. It should be appreciated that speaker 904 may take the form of an open air speaker, headphones, or any other kind of speaker capable of presenting audio.

In one implementation, a gaze tracking camera 912 is included in the HMD 102 to enable tracking of the gaze of the user. The gaze tracking camera captures images of the user's eyes, which are analyzed to determine the gaze direction of the user. In one implementation, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 912, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 926 is configured to provide signals to tactile feedback hardware included in either the HMD 102 or another device operated by the user, such as interface object 104. The tactile feedback may take the form of various kinds of tactile sensations, such as vibration feedback, temperature feedback, pressure feedback, etc. The interface object 104 can include corresponding hardware for rendering such forms of tactile feedback.

Figure 10:
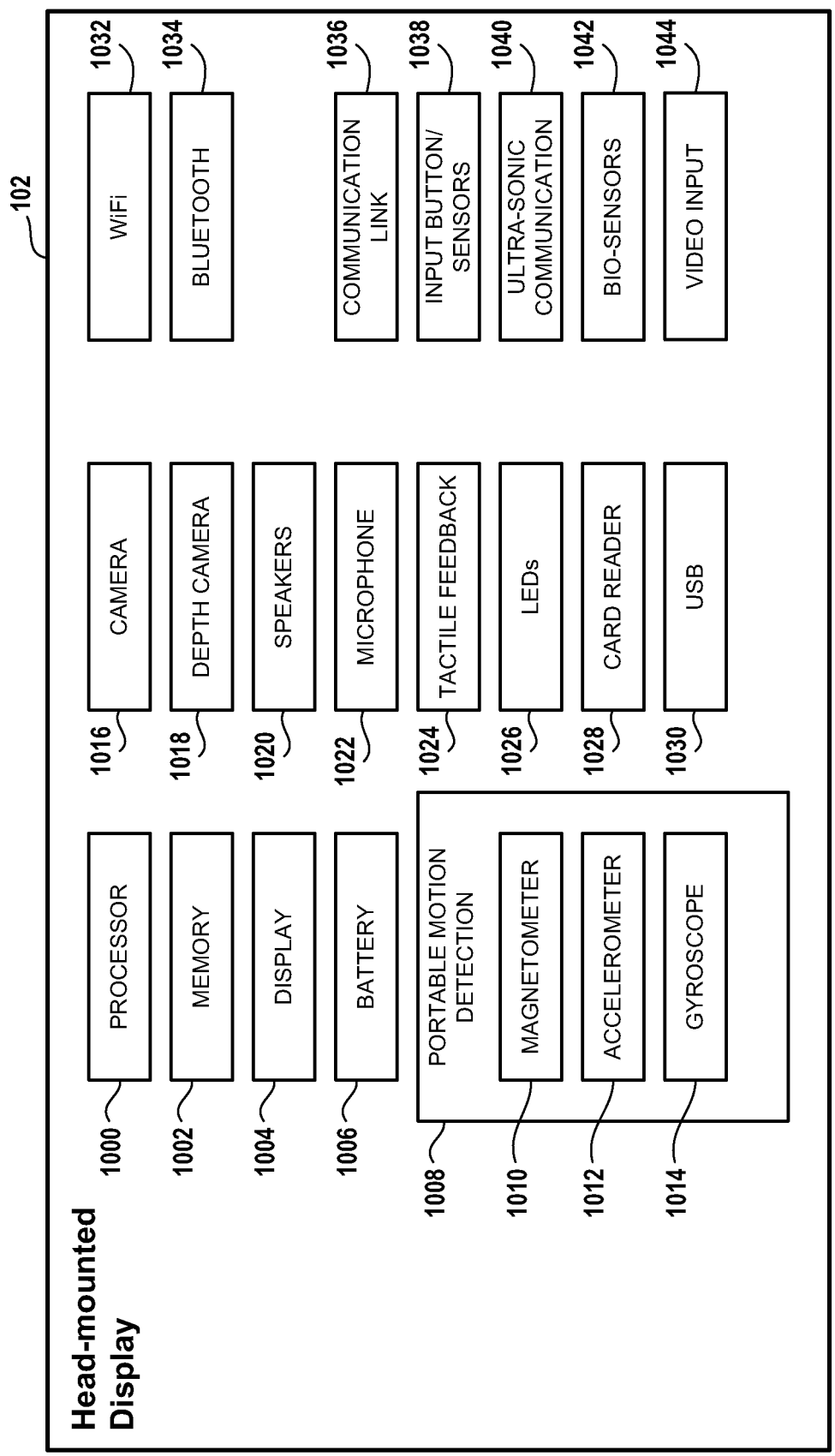
FIG. 10 illustrates components of a head-mounted display, in accordance with an implementation of the disclosure.

With reference to FIG. 10, a diagram illustrating components of a head-mounted display 102 is shown, in accordance with an implementation of the disclosure. The head-mounted display 102 includes a processor 1000 for executing program instructions. A memory 1002 is provided for storage purposes, and may include both volatile and non-volatile memory. A display 1004 is included which provides a visual interface that a user may view. A battery 1006 is provided as a power source for the head-mounted display 102. A motion detection module 1008 may include any of various kinds of motion sensitive hardware, such as a magnetometer 1010, an accelerometer 1012, and a gyroscope 1014.

An accelerometer is a device for measuring acceleration and gravity induced reaction forces. Single and multiple axis models are available to detect magnitude and direction of the acceleration in different directions. The accelerometer is used to sense inclination, vibration, and shock. In one implementation, three accelerometers 1012 are used to provide the direction of gravity, which gives an absolute reference for two angles (world-space pitch and world-space roll).

A magnetometer measures the strength and direction of the magnetic field in the vicinity of the head-mounted display. In one implementation, three magnetometers 1010 are used within the head-mounted display, ensuring an absolute reference for the world-space yaw angle. In one implementation, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one implementation, accelerometer 1012 is used together with magnetometer 1010 to obtain the inclination and azimuth of the head-mounted display 102.

In some implementations, the magnetometers of the head-mounted display are configured so as to be read during times when electromagnets in other nearby devices are inactive.

A gyroscope is a device for measuring or maintaining orientation, based on the principles of angular momentum. In one implementation, three gyroscopes 1014 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1016 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1018 may be included in the head-mounted display 102 for sensing depth information of objects in a real environment.

The head-mounted display 102 includes speakers 1020 for providing audio output. Also, a microphone 1022 may be included for capturing audio from the real environment, including sounds from the ambient environment, speech made by the user, etc. The head-mounted display 102 includes tactile feedback module 1024 for providing tactile feedback to the user. In one implementation, the tactile feedback module 1024 is capable of causing movement and/or vibration of the head-mounted display 102 so as to provide tactile feedback to the user.

LEDs 1026 are provided as visual indicators of statuses of the head-mounted display 102. For example, an LED may indicate battery level, power on, etc. A card reader 1028 is provided to enable the head-mounted display 102 to read and write information to and from a memory card. A USB interface 1030 is included as one example of an interface for enabling connection of peripheral devices, or connection to other devices, such as other portable devices, computers, etc. In various implementations of the head-mounted display 102, any of various kinds of interfaces may be included to enable greater connectivity of the head-mounted display 102.

A WiFi module 1032 is included for enabling connection to the Internet or a local area network via wireless networking technologies. Also, the head-mounted display 102 includes a Bluetooth module 1034 for enabling wireless connection to other devices. A communications link 1036 may also be included for connection to other devices. In one implementation, the communications link 1036 utilizes infrared transmission for wireless communication. In other implementations, the communications link 1036 may utilize any of various wireless or wired transmission protocols for communication with other devices.

Input buttons/sensors 1038 are included to provide an input interface for the user. Any of various kinds of input interfaces may be included, such as buttons, touchpad, joystick, trackball, etc. An ultra-sonic communication module 1040 may be included in head-mounted display 102 for facilitating communication with other devices via ultra-sonic technologies.

Bio-sensors 1042 are included to enable detection of physiological data from a user. In one implementation, the bio-sensors 1042 include one or more dry electrodes for detecting bio-electric signals of the user through the user's skin.

A video input 1044 is configured to receive a video signal from a primary processing computer (e.g. main game console) for rendering on the HMD. In some implementations, the video input is an HDMI input.

The foregoing components of head-mounted display 102 have been described as merely exemplary components that may be included in head-mounted display 102. In various implementations of the disclosure, the head-mounted display 102 may or may not include some of the various aforementioned components. Implementations of the head-mounted display 102 may additionally include other components not presently described, but known in the art, for purposes of facilitating aspects of the present disclosure as herein described.

Figure 11:
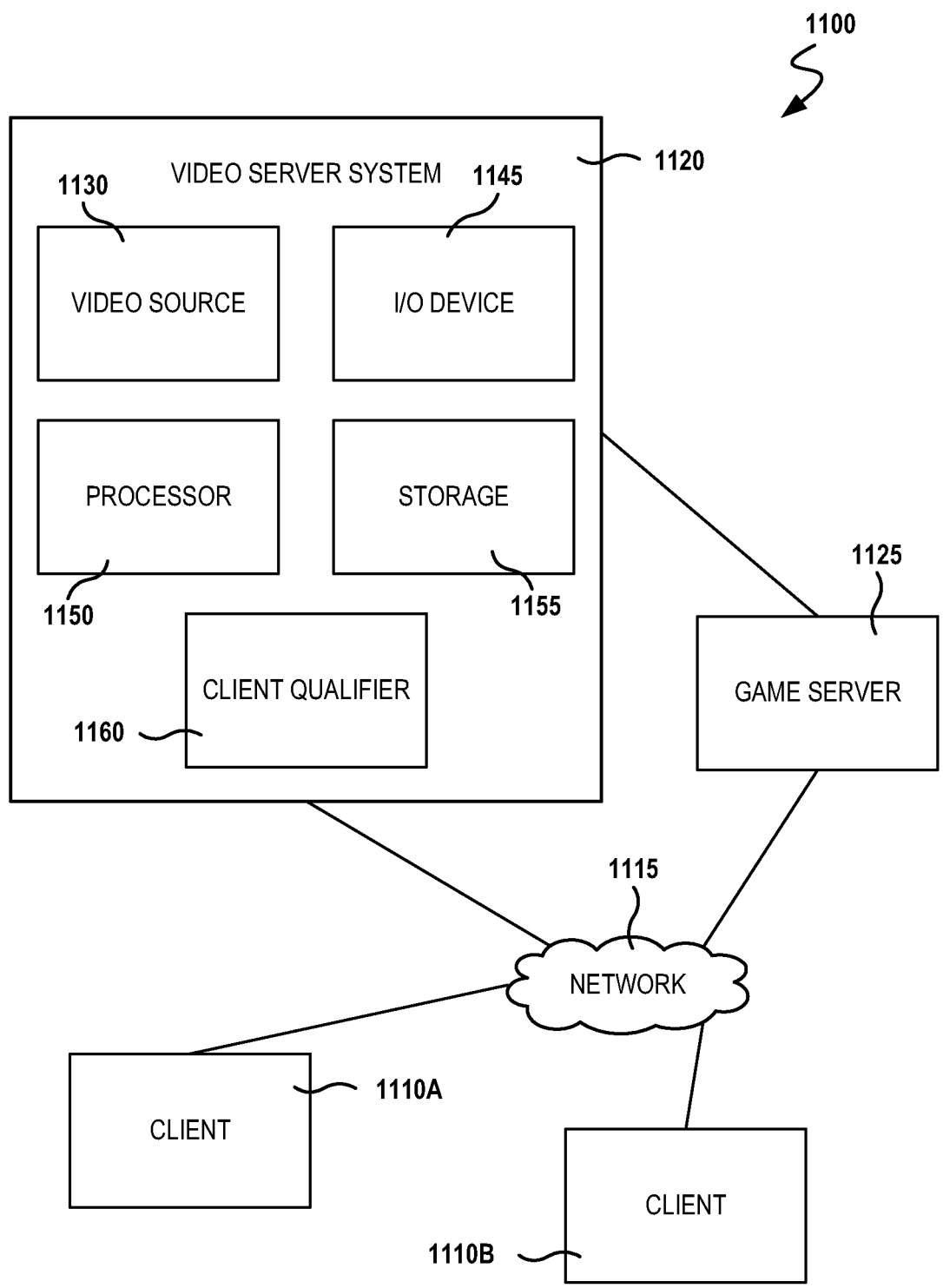
FIG. 11 is a block diagram of a Game System 1100, according to various implementations of the disclosure.

FIG. 11 is a block diagram of a Game System 1100, according to various implementations of the disclosure. Game System 1100 is configured to provide a video stream to one or more Clients 1110 via a Network 1115. Game System 1100 typically includes a Video Server System 1120 and an optional game server 1125. Video Server System 1120 is configured to provide the video stream to the one or more Clients 1110 with a minimal quality of service. For example, Video Server System 1120 may receive a game command that changes the state of or a point of view within a video game, and provide Clients 1110 with an updated video stream reflecting this change in state with minimal lag time. The Video Server System 1120 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative implementations of the disclosure.

Clients 1110, referred to herein individually as 1110A, 1110B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1110 are configured to receive encoded video streams, decode the video streams, and present the resulting video to a user, e.g., a player of a game. The processes of receiving encoded video streams and/or decoding the video streams typically includes storing individual video frames in a receive buffer of the Client. The video streams may be presented to the user on a display integral to Client 1110 or on a separate device such as a monitor or television. Clients 1110 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1110 are optionally geographically dispersed. The number of clients included in Game System 1100 may vary widely from one or two to thousands, tens of thousands, or more. As used herein, the term "game player" is used to refer to a person that plays a game and the term "game playing device" is used to refer to a device used to play a game. In some implementations, the game playing device may refer to a plurality of computing devices that cooperate to deliver a game experience to the user. For example, a game console and an HMD may cooperate with the video server system 1120 to deliver a game viewed through the HMD. In one implementation, the game console receives the video stream from the video server system 1120, and the game console forwards the video stream, or updates to the video stream, to the HMD for rendering.

Clients 1110 are configured to receive video streams via Network 1115. Network 1115 may be any type of communication network including, a telephone network, the Internet, wireless networks, powerline networks, local area networks, wide area networks, private networks, and/or the like. In typical implementations, the video streams are communicated via standard protocols, such as TCP/IP or UDP/IP. Alternatively, the video streams are communicated via proprietary standards.

A typical example of Clients 1110 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1110 may, but are not required to, further include systems configured for modifying received video. For example, a Client may be configured to perform further rendering, to overlay one video image on another video image, to crop a video image, and/or the like. For example, Clients 1110 may be configured to receive various types of video frames, such as I-frames, P-frames and B-frames, and to process these frames into images for display to a user. In some implementations, a member of Clients 1110 is configured to perform further rendering, shading, conversion to 3-D, or like operations on the video stream. A member of Clients 1110 is optionally configured to receive more than one audio or video stream. Input devices of Clients 1110 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1110 is generated and provided by Video Server System 1120. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1110 are typically configured to receive inputs from a user. These inputs may include game commands configured to change the state of the video game or otherwise affect game play. The game commands can be received using input devices and/or may be automatically generated by computing instructions executing on Clients 1110. The received game commands are communicated from Clients 1110 via Network 1115 to Video Server System 1120 and/or Game Server 1125. For example, in some implementations, the game commands are communicated to Game Server 1125 via Video Server System 1120. In some implementations, separate copies of the game commands are communicated from Clients 1110 to Game Server 1125 and Video Server System 1120. The communication of game commands is optionally dependent on the identity of the command. Game commands are optionally communicated from Client 1110A through a different route or communication channel that that used to provide audio or video streams to Client 1110A.

Game Server 1125 is optionally operated by a different entity than Video Server System 1120. For example, Game Server 1125 may be operated by the publisher of a multiplayer game. In this example, Video Server System 1120 is optionally viewed as a client by Game Server 1125 and optionally configured to appear from the point of view of Game Server 1125 to be a prior art client executing a prior art game engine. Communication between Video Server System 1120 and Game Server 1125 optionally occurs via Network 1115. As such, Game Server 1125 can be a prior art multiplayer game server that sends game state information to multiple clients, one of which is game server system 1120. Video Server System 1120 may be configured to communicate with multiple instances of Game Server 1125 at the same time. For example, Video Server System 1120 can be configured to provide a plurality of different video games to different users. Each of these different video games may be supported by a different Game Server 1125 and/or published by different entities. In some implementations, several geographically distributed instances of Video Server System 1120 are configured to provide game video to a plurality of different users. Each of these instances of Video Server System 1120 may be in communication with the same instance of Game Server 1125. Communication between Video Server System 1120 and one or more Game Server 1125 optionally occurs via a dedicated communication channel. For example. Video Server System 1120 may be connected to Game Server 1125 via a high bandwidth channel that is dedicated to communication between these two systems.

Video Server System 1120 comprises at least a Video Source 1130, an I/O Device 1145, a Processor 1150, and non-transitory Storage 1155. Video Server System 1120 may include one computing device or be distributed among a plurality of computing devices. These computing devices are optionally connected via a communications system such as a local area network.

Video Source 1130 is configured to provide a video stream, e.g., streaming video or a series of video frames that form a moving picture. In some implementations, Video Source 1130 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1125. Game Server 1125 may maintain a copy of the state of the game based on game commands received from multiple players using geographically disperse clients. In these cases, the game state is provided by Game Server 1125 to Video Source 1130, wherein a copy of the game state is stored and rendering is performed. Game Server 1125 may receive game commands directly from Clients 1110 via Network 1115, and/or may receive game commands via Video Server System 1120.

Video Source 1130 typically includes rendering logic, e.g., hardware, firmware, and/or software stored on a computer readable medium such as Storage 1155. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1110. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative implementations Video Source 1130 includes a video recording device such as a camera. This camera may be used to generate delayed or live video that can be included in the video stream of a computer game. The resulting video stream optionally includes both rendered images and images recorded using a still or video camera. Video Source 1130 may also include storage devices configured to store previously recorded video to be included in a video stream. Video Source 1130 may also include motion or positioning sensing devices configured to detect motion or position of an object, e.g., person, and logic configured to determine a game state or produce video-based on the detected motion and/or position.

Video Source 1130 is optionally configured to provide overlays configured to be placed on other video. For example, these overlays may include a command interface, log in instructions, messages to a game player, images of other game players, video feeds of other game players (e.g., webcam video). In implementations of Client 1110A including a touch screen interface or a gaze detection interface, the overlay may include a virtual keyboard, joystick, touch pad, and/or the like. In one example of an overlay a player's voice is overlaid on an audio stream. Video Source 1130 optionally further includes one or more audio sources.

In implementations wherein Video Server System 1120 is configured to maintain the game state based on input from more than one player, each player may have a different point of view comprising a position and direction of view. Video Source 1130 is optionally configured to provide a separate video stream for each player based on their point of view. Further, Video Source 1130 may be configured to provide a different frame size, frame data size, and/or encoding to each of Client 1110. Video Source 1130 is optionally configured to provide 3-D video.

I/O Device 1145 is configured for Video Server System 1120 to send and/or receive information such as video, commands, requests for information, a game state, gaze information, device motion, device location, user motion, client identities, player identities, game commands, security information, audio, and/or the like. I/O Device 1145 typically includes communication hardware such as a network card or modem. I/O Device 1145 is configured to communicate with Game Server 1125. Network 1115, and/or Clients 1110.

Processor 1150 is configured to execute logic, e.g. software, included within the various components of Video Server System 1120 discussed herein. For example, Processor 1150 may be programmed with software instructions in order to perform the functions of Video Source 1130, Game Server 1125, and/or a Client Qualifier 1160. Video Server System 1120 optionally includes more than one instance of Processor 1150. Processor 1150 may also be programmed with software instructions in order to execute commands received by Video Server System 1120, or to coordinate the operation of the various elements of Game System 1100 discussed herein. Processor 1150 may include one or more hardware device. Processor 1150 is an electronic processor.

Storage 1155 includes non-transitory analog and/or digital storage devices. For example, Storage 1155 may include an analog storage device configured to store video frames. Storage 1155 may include a computer readable digital storage, e.g. a hard drive, an optical drive, or solid state storage. Storage 1115 is configured (e.g. by way of an appropriate data structure or file system) to store video frames, artificial frames, a video stream including both video frames and artificial frames, audio frame, an audio stream, and/or the like. Storage 1155 is optionally distributed among a plurality of devices. In some implementations, Storage 1155 is configured to store the software components of Video Source 1130 discussed elsewhere herein. These components may be stored in a format ready to be provisioned when needed.

Video Server System 1120 optionally further comprises Client Qualifier 1160. Client Qualifier 1160 is configured for remotely determining the capabilities of a client, such as Clients 1110A or 1110B. These capabilities can include both the capabilities of Client 1110A itself as well as the capabilities of one or more communication channels between Client 1110A and Video Server System 1120. For example, Client Qualifier 1160 may be configured to test a communication channel through Network 1115.

Client Qualifier 1160 can determine (e.g., discover) the capabilities of Client 1110A manually or automatically. Manual determination includes communicating with a user of Client 1110A and asking the user to provide capabilities. For example, in some implementations, Client Qualifier 1160 is configured to display images, text, and/or the like within a browser of Client 1110A. In one implementation, Client 1110A is an HMD that includes a browser. In another implementation, client 1110A is a game console having a browser, which may be displayed on the HMD. The displayed objects request that the user enter information such as operating system, processor, video decoder type, type of network connection, display resolution, etc. of Client 1110A. The information entered by the user is communicated back to Client Qualifier 1160.

Automatic determination may occur, for example, by execution of an agent on Client 1110A and/or by sending test video to Client 1110A. The agent may comprise computing instructions, such as java script, embedded in a web page or installed as an add-on. The agent is optionally provided by Client Qualifier 1160. In various implementations, the agent can find out processing power of Client 1110A, decoding and display capabilities of Client 1110A, lag time reliability and bandwidth of communication channels between Client 1110A and Video Server System 1120, a display type of Client 1110A, firewalls present on Client 1110A, hardware of Client 1110A, software executing on Client 1110A, registry entries within Client 1110A, and/or the like.

Client Qualifier 1160 includes hardware, firmware, and/or software stored on a computer readable medium. Client Qualifier 1160 is optionally disposed on a computing device separate from one or more other elements of Video Server System 1120. For example, in some implementations, Client Qualifier 1160 is configured to determine the characteristics of communication channels between Clients 1110 and more than one instance of Video Server System 1120. In these implementations the information discovered by Client Qualifier can be used to determine which instance of Video Server System 1120 is best suited for delivery of streaming video to one of Clients 1110.

Implementations of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above implementations in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present implementations are to be considered as illustrative and not restrictive, and the disclosure is not to be limited to the details given herein, but may be modified within the scope and equivalents of the present disclosure.

What is claimed is:

1. A method for rendering mixed reality video, comprising:

capturing head mounted display (HMD) game play by a user of a video game being executed on a computing system, the HMD game play being captured from game play point of view (POV) based on a viewing direction of the user while wearing the HMD;

identifying, by the computing system, a coordinate location of a camera having a camera POV used to view the user during the HMD game play and capturing video from the camera POV;

replaying the HMD game play using metadata captured during the HMD game play to adjust the game play POV to align with the camera POV, said replaying causing the adjusted game play POV to have a different viewing angle into the HMI) game play than the game play POV, wherein replaying the HMD game play generates video frames for video from said adjusted game play POV; and rendering a mixed reality video by compositing video from the HMD game play after said adjusting of the game play POV and said captured video from the camera POV, the rendering includes removal of a background captured in the video from the camera POV, such that the user appears partially within a scene of the video game when rendered in said mixed reality video.

2. The method of claim 1, wherein the replaying of the HMD game play is processed by automatically re-executing the HMD game play using inputs obtained from the metadata captured during the HMD game play by the user to generate said video frames.

3. The method of claim 2, wherein adjusting the game play POV to substantially align with the camera POV changes an angle and position of a virtual camera into a scene of the HMD game play when replaying the HMD game play.

4. The method of claim 1, wherein the replaying of the HMD game play causes game code of the video game to be automatically re-executed and controlled by state data and inputs obtained from the metadata captured during the HMD game play of the user when the video of the HMD game play was generated.

5. The method of claim 4, wherein adjusting the game play POV to substantially align with the camera POV changes an angle and position of a virtual camera into a scene of the HMD game play when replaying the HMD game play.

6. The method of claim 1, wherein aligning the game play POV with the camera POV provides an alignment that includes one or more instances of non-alignment and alignment during the mixed reality video.

7. The method of claim 1, wherein said compositing of the video from the HMD game play after said adjusting of the game play POV and video from the camera POV produces a blending of said videos, the blending produces the mixed reality video.

8. The method of claim 1, wherein the camera is positioned substantially behind the user at a fixed position and angle to define the camera POV during the HMD game play.

9. The method of claim 1, wherein the adjusting the game play POV to align with the camera POV results in an adjusted camera POV that is different than the game play POV.

10. The method of claim 1, wherein the adjusting the game play POV to substantially align with the camera POV results in the mixed reality video having a point of view that is substantially behind.

11. The method of claim 1, wherein the replaying the HMD game play includes using the metadata to cause the HMD game play to automatically progress through the HMD game play without user input.

12. The method of claim 1, wherein the removal of the background includes performing a green screen background removal from the camera POV video, said background removal is performed digitally to create a user integration video.

13. The method of claim 1, further comprising:
executing a calibration process to relate the coordinate location of the camera to a spatial coordinate position of the HMD when worn by the user.

14. The method of claim 1, wherein the metadata from the HMD game play by the user and the video from the camera POV is processed during a first pass, and the replaying and rendering of the mixed reality video is processed during a second pass.

15. A method for rendering mixed reality video, comprising:
capturing head mounted display (HMD) game play by a user of a video game being executed on a computing system, the HMD game play being captured from game play point of view (POV) based on a viewing direction of the user while wearing the HMD;
identifying, by the computing system, a coordinate location of a camera having a camera POV used to view the user during the HMD game play and capturing video from the camera POV;
replaying the HMD game play using metadata captured during the HMD game play to adjust the game play POV to set a view offset with respect to the camera POV, said replaying causing the adjusted game play POV to have a different viewing angle into the HMD game play than the game play POV, wherein replaying the HMD game play generates video frames for video from said adjusted game play POV; and
rendering a mixed reality video by compositing video from the HMD game play after said adjusting of the game play POV and said captured video from the camera POV, the rendering includes removal of a background captured in the video from the camera POV, such that the user appears partially within a scene of the video game when rendered in said mixed reality video.

16. The method of claim 15, wherein the replaying of the HMD game play is processed by automatically re-executing the HMD game play using inputs obtained from the metadata captured during the HMD game play by the user to generate said video frames.

17. The method of claim 16, wherein adjusting the game play POV to set the view offset with respect to the camera POV changes an angle and position of a virtual camera into a scene of the HMD game play when replaying the HMD game play.

18. The method of claim 15, wherein the view offset provides for an intentional misalignment between the game play POV and the camera POV, such that the view offset enables a side view of the user during the HMD game play, the side view being shown in the mixed reality video.

19. The method of claim 15, wherein the mixed reality video is defined by a plurality of video segments, and each of the plurality of video segments is produced to include the view offset or one or more other view offsets.

20. The method of claim 15, wherein the metadata from the HMD game play by the user and the video from the camera POV is processed during a first pass, and the replaying and rendering of the mixed reality video is processed during a second pass.

* * * * *